US011883789B2

(12) United States Patent
Watanabe et al.

(10) Patent No.: US 11,883,789 B2
(45) Date of Patent: Jan. 30, 2024

(54) MICROWAVE HEATING METHOD, MICROWAVE HEATING APPARATUS, AND CHEMICAL REACTION METHOD

(71) Applicant: NATIONAL INSTITUTE OF ADVANCED INDUSTRIAL SCIENCE AND TECHNOLOGY, Tokyo (JP)

(72) Inventors: Yuichi Watanabe, Tsukuba (JP); Sei Uemura, Tsukuba (JP); Masateru Nishioka, Sendai (JP); Masato Miyakawa, Sendai (JP); Takashi Nakamura, Sendai (JP)

(73) Assignee: NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 802 days.

(21) Appl. No.: 16/968,079

(22) PCT Filed: Feb. 7, 2019

(86) PCT No.: PCT/JP2019/004351
§ 371 (c)(1),
(2) Date: Aug. 6, 2020

(87) PCT Pub. No.: WO2019/156142
PCT Pub. Date: Aug. 15, 2019

(65) Prior Publication Data
US 2021/0023526 A1    Jan. 28, 2021

(30) Foreign Application Priority Data

Feb. 8, 2018   (JP) .................. 2018-021455
Feb. 8, 2018   (JP) .................. 2018-021456
Feb. 8, 2018   (JP) .................. 2018-021457
Sep. 27, 2018 (JP) .................. 2018-182605

(51) Int. Cl.
*B01J 19/12*   (2006.01)
*B23K 1/00*    (2006.01)
*B23K 3/06*    (2006.01)
*F27B 9/06*    (2006.01)
*H05B 6/64*    (2006.01)
*H05B 6/68*    (2006.01)
*H05B 6/80*    (2006.01)
*B23K 101/42*  (2006.01)

(52) U.S. Cl.
CPC ........... *B01J 19/126* (2013.01); *B23K 1/0016* (2013.01); *B23K 3/0607* (2013.01); *F27B 9/062* (2013.01); *F27B 9/067* (2013.01); *H05B 6/6408* (2013.01); *H05B 6/6488* (2013.01); *H05B 6/686* (2013.01); *H05B 6/80* (2013.01); *B01J 2219/0871* (2013.01); *B01J 2219/1206* (2013.01); *B23K 2101/42* (2018.08); *H05B 2206/046* (2013.01)

(58) Field of Classification Search
CPC .. B01J 19/12; B01J 19/126; B01J 2219/0871; B01J 2219/1206; B23K 1/0016; B23K 3/0607; B23K 2101/42
USPC ........................................................ 423/659
See application file for complete search history.

(56) References Cited

U.S. PATENT DOCUMENTS

| | | |
|---|---|---|
| 6,365,885 B1 | 4/2002 | Roy et al. |
| 2004/0084444 A1 | 5/2004 | Wang et al. |
| 2009/0230125 A1 | 9/2009 | Kono et al. |
| 2012/0055100 A1 | 3/2012 | Yamazoe et al. |
| 2013/0233849 A1 | 9/2013 | Saida et al. |
| 2013/0344703 A1 | 12/2013 | Shimizu et al. |
| 2014/0361009 A1 | 12/2014 | Mihara et al. |
| 2015/0223295 A1 | 8/2015 | Uchida et al. |
| 2016/0027557 A1 | 1/2016 | Saito et al. |

FOREIGN PATENT DOCUMENTS

| | | |
|---|---|---|
| CN | 102573161 A | 7/2012 |
| CN | 103392387 A | 11/2013 |
| CN | 104704912 A | 6/2015 |
| EP | 2 741 575 A1 | 6/2014 |
| JP | 58-164288 A | 9/1983 |
| JP | 2005-322582 A | 11/2005 |
| JP | 2006-221958 A | 8/2006 |
| JP | 2010-274383 A | 12/2010 |
| JP | 2011-81914 A | 4/2011 |
| JP | 2012-75996 A | 4/2012 |
| JP | 2013-101808 A | 5/2013 |
| JP | 2016-25257 A | 2/2016 |
| JP | 5892635 B2 | 3/2016 |
| JP | 2017-200671 A | 11/2017 |
| TW | 201309098 A1 | 2/2013 |
| TW | 201328435 A1 | 7/2013 |
| WO | WO2012/115165 A1 | 8/2012 |
| WO | WO 2014/050828 A1 | 4/2014 |
| WO | WO 2017/138381 A1 | 8/2017 |

OTHER PUBLICATIONS

Extended European Search Report for corresponding European Application No. 19750634.8, dated Oct. 27, 2021.
(Continued)

*Primary Examiner* — Edward M Johnson
(74) *Attorney, Agent, or Firm* — Birch, Stewart, Kolasch & Birch, LLP

(57) ABSTRACT

A microwave heating method using a microwave, including: controlling a frequency of the microwave, to form a single-mode standing wave; disposing an object to be heated in a magnetic field region where a strength of a magnetic field formed by the single-mode standing wave is uniform and maximum; and heating the object to be heated by magnetic heat generation by magnetic loss caused by an action of the magnetic field of the magnetic field region, and/or induction heating by an induced current generated in the object to be heated due to the magnetic field of the magnetic field region.

38 Claims, 16 Drawing Sheets

(56) References Cited

OTHER PUBLICATIONS

Japanese Office Action for corresponding Japanese Application No. 2019-021608, dated May 16, 2023, with English translation.
Japanese Notice of Reasons for Refusal for corresponding Japanese Application No. 2019-021608, dated Nov. 29, 2022, with an English translation.
Taiwanese Office Action for corresponding Taiwanese Application No. 108104157, dated Mar. 20, 2023, with English translation.
International Search Report for PCT/JP2019/004351 dated Mar. 26, 2019.
Written Opinion of the International Searching Authority for PCT/JP2019/004351 (PCT/ISA/237) dated Mar. 26, 2019.
Japanese Office Action for corresponding Japanese Application No. 2018-182605, dated Jul. 5, 2022, with English translation.
Taiwanese Office Action and Search Report for corresponding Taiwanese Application No. 108104157, dated Dec. 5, 2022, with an English translation.
Korean Office Action for corresponding Korean Application No. 10-2020-7021949, dated Aug. 18, 2023, with English translation.
Chinese Office Action and Search Report for corresponding Chinese Application No. 201980008403.1, dated Mar. 21, 2022, with English translation.

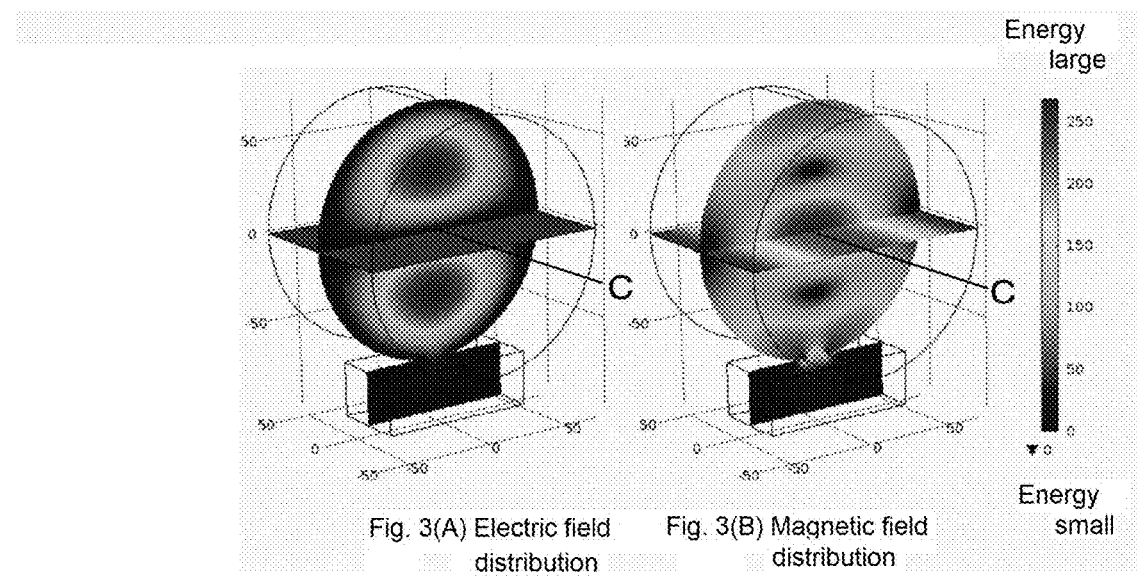
Fig. 3(A) Electric field distribution    Fig. 3(B) Magnetic field distribution
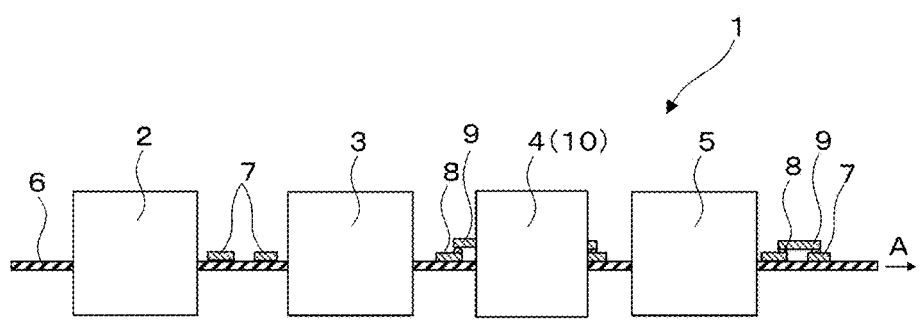
Fig. 4

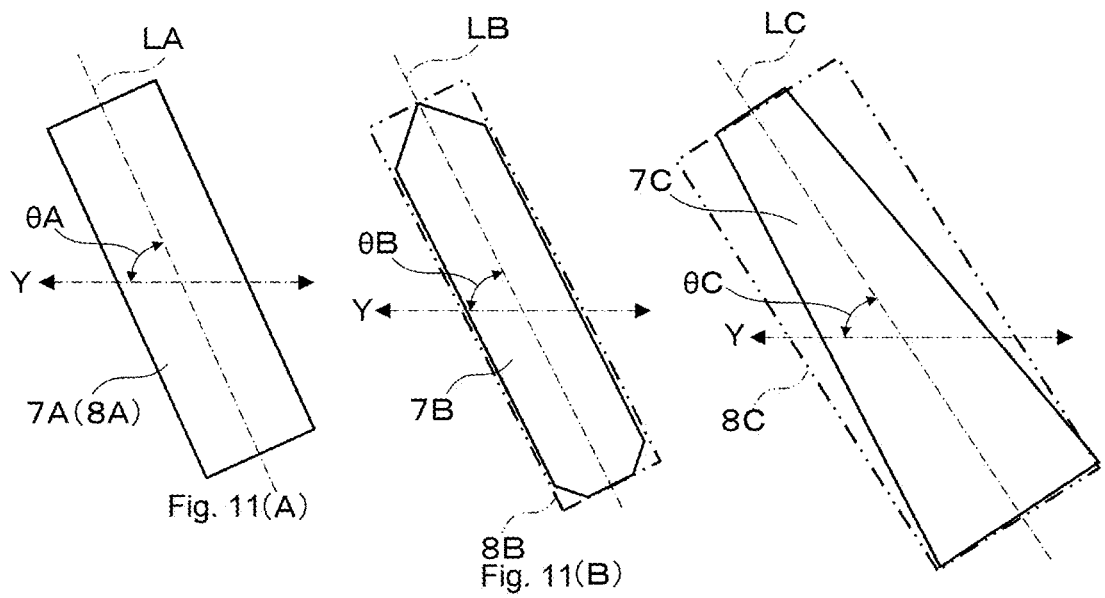
Fig. 11(A)
Fig. 11(B)
Fig. 11(C)
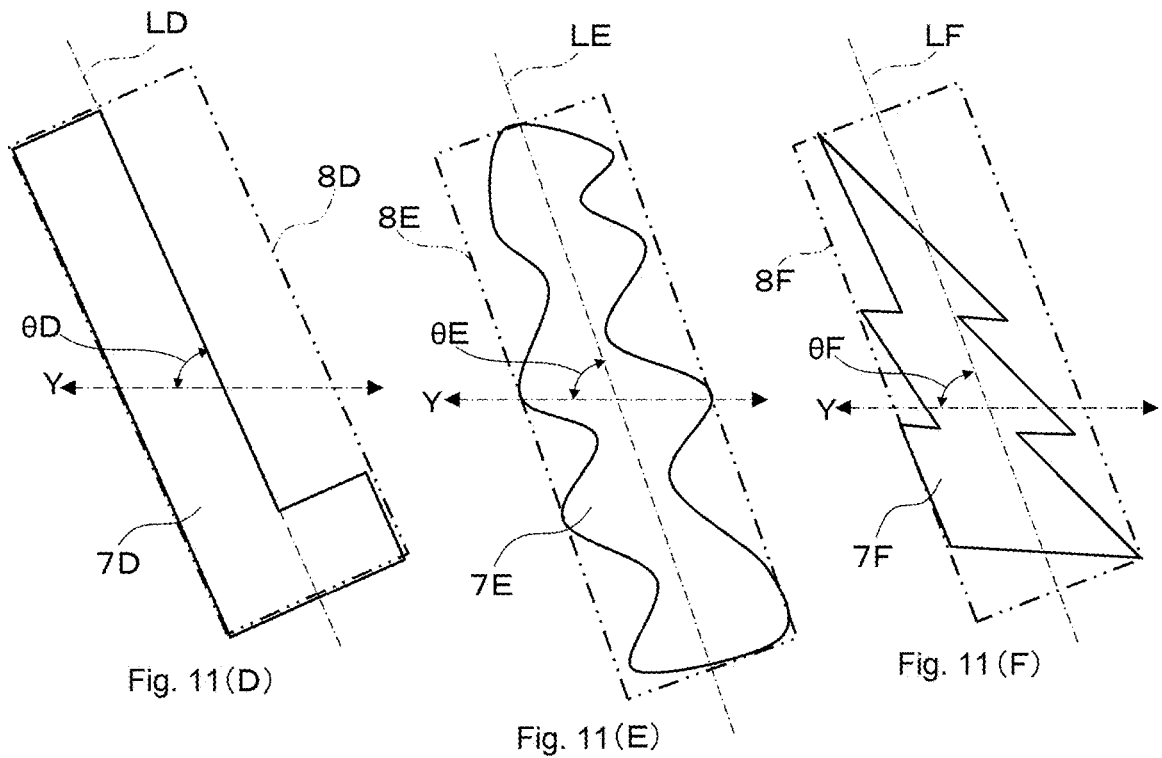
Fig. 11(D)
Fig. 11(E)
Fig. 11(F)

Temperature distribution of sheet material

Temperature distribution of conductive paste applied part

MICROWAVE HEATING METHOD, MICROWAVE HEATING APPARATUS, AND CHEMICAL REACTION METHOD

FIELD OF THE INVENTION

The present invention relates to a microwave heating method, a microwave heating apparatus and a chemical reaction method.

BACKGROUND OF THE INVENTION

Microwaves have been widely used in household appliances, such as microwave ovens, and then practical development and use as industrial heating systems have been studied. Since microwave irradiation directly heats an object to be heated, the object can be heated in a short time and there is an advantage of reducing unevenness of temperature due to heat conduction. In addition, there are advantages that the object can be heated in a non-contact manner and only those with good microwave absorption can be selectively heated.

In industrial fields, such as deposition, semiconductor device fabrication, printing, electronics wiring, and surface treatment, continuous heat treatment of a sheet-shaped material or a thin film coating the surface of a sheet-shaped material leads to improvements in manufacturing cost and quality, for example, the automation and labor savings of heat treatment. Hence, various methods for making a microwave heat treatment method continuous have been proposed.

In terms of heat treatment by microwave irradiation, microwaves being electromagnetic waves change in energy intensity in wavelength cycles. Accordingly, uneven heating is likely to occur. Hence, in many cases, a measure, for example, moving the position of an object to be heated over time to uniformly heat the object to be heated, is taken. As a technique to handle this problem, for example, Patent Literature 1 describes a microwave heating apparatus that uses a cavity resonator. It is described that in this technique, a standing wave in $TM_{110}$ mode is generated in a cuboid cavity resonator, and a sheet including a conductive or magnetic thin film is uniformly heated with high efficiency. Moreover, Patent Literature 2 describes that a microwave heating apparatus using a rectangular waveguide (rectangular cavity resonator) places an object to be heated at a position where a magnetic field (magnetic field) strength of a standing wave is maximum, moves the object to be heated to the position, and accordingly heats the object to be heated efficiently.

It is considered that using the cavity resonator in this manner allows forming a standing wave inside the cavity resonator and heating an object to be heated uniformly and highly efficiently.

CITATION LIST

Patent Literatures

Patent Literature 1: JP-A-2006-221958 ("JP-A" means unexamined published Japanese patent application)
Patent Literature 2: JP-A-2013-101808

SUMMARY OF THE INVENTION

Technical Problem

In the formation of a standing wave using a cavity resonator, the state of the standing wave in the resonator is monitored to continuously generate a standing wave. If necessary, the frequency of a microwave supplied into the cavity is adjusted, or a dielectric or metal piece is inserted into the cavity, to adjust a resonance frequency. In such a case, when a dielectric or metal piece is inserted into the cavity, the magnetic field strength distribution of a standing wave formed in the cavity resonator may shift depending on the amount of insertion. As a result, if an object to be hated is always supplied to a fixed position in the cavity resonator upon heating the object to be heated, it leads to a misalignment between the supply position of the object to be heated and the position of the maximum magnetic field strength. In order to handle this, it is conceivable to change the supply position of the object to be heated in such a manner as to follow the changed position of the maximum magnetic field strength. However, it increases the size of the apparatus and therefore is not practical.

The present invention is contemplated for providing a microwave heating apparatus that can cause a standing wave formed in a cavity resonator, to heat an object to be heated comprising a magnetic substance, a magnetic loss material or a conductive material, or a composite material including a magnetic substance, a magnetic loss material or a conductive material, with high efficiency and high repeatability, without requiring, for example, positioning along a magnetic field strength distribution.

Means for Solving the Problems

As a result of making a diligent study after considering the above problem, the inventors of the present invention have found that the use of a cylindrical or rectangular tubular cavity resonator allows forming a standing wave whose maximum magnetic field portion is always at the central axis of the cavity resonator. Further, the inventors of the present invention have found that an object to be heated comprising a magnetic loss material, or a composite material including a magnetic loss material, is supplied in such a manner as to pass the central axis of the cavity resonator, and accordingly the heating state of the supplied object to be heated can be always made constant.

The inventors of the present invention have further studied based on these findings, and have been completed the present invention.

That is, the problems of the present invention can be solved by the following means:

[1]
A microwave heating method using a microwave, including:
controlling a frequency of the microwave, to form a single-mode standing wave;
disposing an object to be heated in a magnetic field region where a strength of a magnetic field formed by the single-mode standing wave is uniform and maximum; and
heating the object to be heated by magnetic heat generation by magnetic loss caused by an action of the magnetic field of the magnetic field region, and/or induction heating by an induced current generated in the object to be heated due to the magnetic field of the magnetic field region.

[2]
The microwave heating method described in the above item [1], wherein the single-mode standing wave is $TM_{n10}$ (where n is an integer of 1 or more) mode or $TE_{10n}$ (where n is an integer of 1 or more) mode.

[3]
The microwave heating method described in the above item [1] or [2], wherein the object to be heated is an electrode pattern disposed on a base and an electrical connection electrode of a device.

[4]

The microwave heating method described in the above item [3], wherein the electrode pattern and the electrode connection electrode are heated, to heat and melt solder disposed on the electrode pattern.

[5]

The microwave heating method described in the above item [3] or [4], wherein a resonator configured to generate the single-mode standing wave is a cylindrical resonator or a rectangular tubular resonator,
wherein the resonator configured to generate the single-mode standing wave includes an inlet and an outlet in opposing positions on a barrel portion wall thereof,
wherein a transfer mechanism is provided, which is configured to transfer the object to be heated in from the inlet and to transfer the object to be heated out from the outlet, and
wherein at least a part of the electrode pattern in a major axis direction thereof is disposed at an angle equal to or greater than 45 degrees and equal to or less than 90 degrees with respect to an oscillation direction of the magnetic field formed by the single-mode standing wave, whereby the electrode pattern is microwave-heated.

[6]

The microwave heating method described in the above item [5], wherein a resonance frequency is detected, which agrees with the single-mode standing wave that changes depending on a placement state of the object to be heated disposed in the resonator, and
wherein the microwave is adjusted to a frequency agreeing with the resonance frequency, to make the microwave apply into the resonator.

[7]

The microwave heating method described in the above item [6], wherein a reflected wave from a microwave irradiation space in the resonator is measured, wherein the resonance frequency agreeing with the single-mode standing wave is detected from a frequency of the microwave that minimizes the reflected wave, on the basis of a measurement signal of the reflected wave, and wherein the frequency of the microwave is controlled.

[8]

The microwave heating method described in the above item [6], wherein energy density of the microwave irradiation space in the resonator is measured, wherein the resonance frequency agreeing with the single-mode standing wave is detected from a frequency of the microwave that maximizes the energy density, on the basis of a measurement signal of the energy density, and wherein the frequency of the microwave is controlled.

[9]

The microwave heating method described in any one of the above items [5] to [8], wherein a plurality of the resonators is disposed, and wherein the plurality of the resonators performs microwave heating continuously.

[10]

The microwave heating method described in any one of the above items [3] to [9], wherein the electrode pattern includes a thin film with insulation property on an upper part and a lower part thereof.

[11]

The microwave heating method described in any one of the above items [5] to [10], wherein it is configured to be capable of moving the base up and down in a direction perpendicular to the oscillation direction of the magnetic field, in the resonator.

[12]

The microwave heating method described in any one of the above items [5] to [11], including:
an upstream step including the steps of
printing a primer or an adhesive layer, on the base,
drying the primer or the adhesive layer,
printing the electrode pattern,
drying the electrode pattern,
applying solder paste,
mounting a device, and
determining microwave irradiation conditions; and
a downstream step including the steps of
removing flux,
applying adhesive, and
curing the adhesive,
wherein the base is continuously transferred by the transfer mechanism, and wherein the upstream step, a microwave heating step by a microwave heating apparatus configured to perform the microwave heating method, and the downstream step are performed in this order.

[13]

The microwave heating method described in the above item [12], wherein in the upstream step, the solder paste application step is performed by a stencil printing apparatus, a dispenser apparatus, or a solder ball mounter.

[14]

The microwave heating method described in the above item [12] or [13], wherein in the downstream step, the flux removal step is a cleaning step, the adhesive application step is a stencil printing step, a screen printing step, or a dispensing step, and the adhesive curing step is a heating step by an excimer lamp, an ultraviolet lamp, an infrared lamp, a hot air apparatus, a hot plate, atmospheric-pressure plasma irradiation means, a xenon flash lamp, or a high humidity chamber.

[15]

The microwave heating method described in any one of the above items [4] to [14], wherein the microwave heating method includes:
the step of placing the electrode pattern on the base via primer; and
the step of connecting the electrical connection electrode formed on the device onto the electrode pattern via the solder, and bonding the device onto the base between the electrode patterns via an adhesive layer, and
wherein an adhesive is formed around the device.

[16]

The microwave heating method described in any one of the above items [3] to [15], wherein at least a part of the electrode pattern in the major axis direction is disposed at an angle equal to or greater than 45 degrees and equal to or less than 90 degrees with respect to an oscillation direction of the magnetic field formed by the single-mode standing wave, whereby the electrode pattern is microwave-heated.

[17]

The microwave heating method described in any one of the above items [3] to [16], wherein at least a part of the electrical connection electrode in a major axis thereof is disposed at an angle equal to or greater than 40 degrees and equal to or less than 90 degrees with respect to an oscillation direction of the magnetic field formed by the single-mode standing wave.

[18]

The microwave heating method described in the above item [1] or [2], wherein the object to be heated is a thin film pattern disposed on the base, wherein the thin film pattern is an anisotropic thin film pattern having an aspect ratio of 3.7 or greater, wherein at least a part of the thin film pattern in a major axis direction thereof is disposed at an angle equal to or greater than 45 degrees and equal to or less than 90 degrees with respect to an oscillation direction of the magnetic field generated in the magnetic field region, and wherein the base is caused to pass through the magnetic field region.

[19]

The microwave heating method described in the above item [18], wherein a length of the thin film pattern in the major axis direction has a length equal to or greater than $\frac{1}{10}$ of a wavelength of the microwave.

[20]

The microwave heating method described in any one of the above items [1] to [19], wherein the microwave heating method is a chemical reaction method that heats the object to be heated with microwaves, to cause a chemical reaction.

[21]

A microwave heating apparatus including:

a cavity resonator being a microwave irradiation space of a cylindrical type or a polygonal tube type where two parallel surfaces face each other with a tube central axis as the center, excluding a tube type whose cross-section in a direction perpendicular to the tube central axis is a rectangle; and a transfer mechanism configured to supply an object to be heated of a magnetic substance, or a magnetic loss material or conductive material, or an object to be heated of a composite material including a magnetic substance, or a magnetic loss material or conductive material, into a space where energy distribution of a magnetic field in the cavity resonator is uniform in such a manner as to pass the object to be heated through a magnetic field region where magnetic field strength of the cavity resonator is maximum and uniform, wherein the object to be heated supplied by the transfer mechanism is heated in the magnetic field region.

[22]

The microwave heating apparatus described in the above item [21], wherein the transfer mechanism passes the object to be heated through a space where electric field (field) strength is minimum upon the object to be heated passing through the magnetic field region.

[23]

The microwave heating apparatus described in the above item [22], wherein the cavity resonator is a cavity resonator including a cylindrical microwave irradiation space, in which a standing wave in $TM_{n10}$ (n is an integer of one or more) mode or $TE_{10n}$ (n is an integer of 1 or more) mode where the magnetic field strength is uniform and maximum along a cylinder central axis is formed, wherein the cavity resonator includes:

an inlet disposed in a barrel portion wall of the cavity resonator, through which a base where the object to be heated that is transferred into the microwave irradiation space is disposed passes; and an outlet disposed in the barrel portion wall of the cavity resonator, through which the base that is transferred out from the microwave irradiation space passes, wherein the transfer mechanism is configured to transfer the base in from the inlet and transfer the base out from the outlet through the magnetic field region where the magnetic field strength is maximum, and wherein at least a part in a major axis direction of a thin film pattern of the object to be heated disposed on the base is set at an angle equal to or greater than 45 degrees and equal to or less than 90 degrees with respect to an oscillation direction of the magnetic field generated in the magnetic field region, and the base is caused to pass through the magnetic field region, whereby the thin film pattern is heated.

[24]

The microwave heating apparatus described in the above item [23], wherein the thin film pattern is an electrode pattern, and wherein the electrode pattern is heated, to melt solder disposed on the electrode pattern.

[25]

The microwave heating apparatus described in the above item [23], wherein the thin film pattern is heated, to be fired.

[26]

The microwave heating apparatus described in any one of the above items [21] to [25], wherein the standing wave formed inside the microwave irradiation space is in $TM_{110}$ mode, and wherein the magnetic field region is a space along the tube central axis of the cavity resonator.

[27]

The microwave heating apparatus described in the above item [26], wherein means for forming the standing wave in $TM_{110}$ mode includes a mechanism configured to control a frequency of a microwave at which a uniform magnetic field distribution state is always maintained along the tube central axis in a state where the object to be heated is inserted in the microwave irradiation space.

[28]

The microwave heating apparatus described in the above item [27], wherein the mechanism configured to control the frequency of the microwave detects a resonance frequency agreeing with the standing wave in $TM_{110}$ mode that changes depending on an insertion state of the object to be heated, to apply a microwave agreeing with the resonance frequency.

[29]

The microwave heating apparatus described in the above item [28], wherein means for detecting the resonance frequency agreeing with the standing wave in $TM_{110}$ mode includes a mechanism configured to measure a reflected wave from the microwave irradiation space, and includes a mechanism configured to control the frequency of the microwave that detects the resonance frequency from a frequency at which the reflected wave is the minimum on the basis of the measurement signal.

[30]

The microwave heating apparatus described in the above item [29], wherein means for detecting the resonance frequency agreeing with the standing wave in $TM_{110}$ mode includes a mechanism configured to measure an energy state in the microwave irradiation space, and includes a mechanism configured to control the frequency of the microwave that detects the resonance frequency from a frequency at which energy density in the microwave irradiation space is the maximum on the basis of the measurement signal.

[31]

The microwave heating apparatus described in any one of the above items [21] to [30], wherein an induced current is generated in the object to be heated under an action of a magnetic field that is maximum at the tube central axis of the cavity resonator, whereby the object to be heated is heated.

[32]

The microwave heating apparatus described in any one of the above items [21] to [31], wherein the microwave heating apparatus includes one or more cavity resonators.

[33]

The microwave heating apparatus described in the above item [21], wherein the object to be heated is a thin film pattern disposed on the base, wherein the microwave heating apparatus is provided with: an upstream apparatus configured to preliminarily dry the base, before heating and firing the base with the microwave heating apparatus; and a downstream apparatus configured to perform post-processing, after firing the thin film pattern with the microwave heating apparatus,
wherein the transfer mechanism transfers the base continuously, and
wherein the upstream apparatus, the microwave heating apparatus, and the downstream apparatus perform processing in this order.
[34]

The microwave heating apparatus described in the above item [33], wherein the upstream apparatus includes an infrared heating apparatus, a hot air heating apparatus, or a hot plate, which preliminarily dries the thin film pattern.
[35]

The microwave heating apparatus described in the above item [33] or [34], wherein the downstream apparatus includes heating means for further sintering the thin film pattern, and
wherein the heating means includes an excimer lamp, an ultraviolet lamp, atmospheric-pressure plasma irradiation means, or a xenon flash lamp. [36]

The microwave heating apparatus described in any one of the above items [21] to [35], wherein the transfer mechanism is capable of moving the object to be heated up and down in a direction perpendicular to the oscillation direction of the magnetic field in the cavity resonator.
[37]

The microwave heating apparatus described in any one of the above items [21] to [36], wherein the microwave heating apparatus is a chemical reaction apparatus configured to heat the object to be heated with a magnetic field generated by a microwave, to cause a chemical reaction.
[38]

A chemical reaction method, including: using the microwave heating method described in any one of the above items [1] to [20], wherein the object to be heated is heated, to cause a chemical reaction.

Effects of the Invention

When forming a standing wave in a cavity resonator, a microwave heating apparatus of the present invention can pass an object to be heated through a position where in the cavity resonator magnetic field strength is maximum and uniform, and heat the object to be heated efficiently and uniformly with high repeatability.

Other and further features and advantages of the invention will appear more fully from the following description, appropriately referring to the accompanying drawings.

BRIEF DESCRIPTION OF DRAWINGS

FIG. 2(A) is a case of a rectangular pattern as an example of a thin film pattern, and FIG. 2(B) is a case of a wavy pattern as an example of the thin film pattern.

FIGS. 3(A) and 3(B) each are a distribution map of electric and magnetic fields generated in a cylindrical cavity resonator, FIG. 3(A) is an electric field distribution map, and FIG. 3(B) is a magnetic field distribution map.

FIG. 4 is a block diagram schematically showing an example of a preferred entire configuration of a soldering and mounting apparatus of the present invention.

FIGS. 11(A) to 11(F) each are a plan view showing an example of a thin film pattern and a rectangular pattern.

FIG. 19(A) is an observation result before magnetic field heating and FIG. 19(B) is an observation result after magnetic field heating.

MODE FOR CARRYING OUT THE INVENTION

A preferred embodiment of a microwave heating apparatus suitable to perform a microwave heating method of the present invention is described with reference to the drawings.
[Microwave Heating Apparatus]
A preferred embodiment of a microwave heating apparatus of the present invention is described with reference to FIG. 1, taking, as an example, a microwave heating apparatus including a cylindrical cavity resonator.

Figure 1:
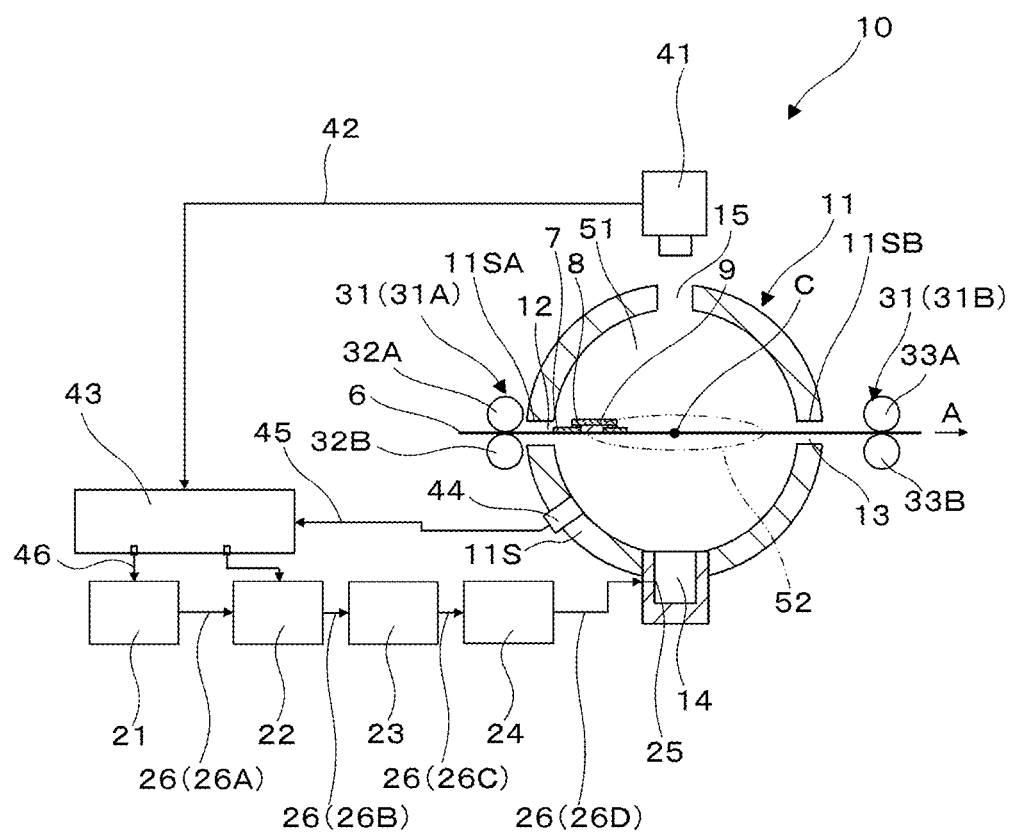
FIG. 1 is a drawing schematically showing an example of a preferred embodiment of a microwave heating apparatus of the present invention, and is a drawing showing a cavity resonator in schematic cross-sectional view.

As shown in FIG. 1, a microwave heating apparatus 10 includes a cavity resonator (hereinafter also referred to as the (cylindrical) cavity resonator) 11 having a cylindrical microwave irradiation space. The cavity resonator 11 can form a standing wave having the maximum and uniform magnetic field strength at a central axis irrespective of whether the cavity resonator 11 is of a cylindrical type or of a polygonal tube type having two parallel surfaces facing each other with a tube central axis as the center, excluding a tube type whose cross-section in a direction perpendicular to the tube central axis is a rectangle.

The cavity resonator 11 includes an inlet 12 provided in a barrel portion wall 11SA of the cavity resonator 11, and an outlet 13 provided in a barrel portion wall 11SB facing the barrel portion wall 11SA, the inlet 12 and the outlet 13 facing each other across a tube central axis (hereinafter referred to as the cylinder central axis or central axis) C of the cavity resonator. The central axis C extends in a direction perpendicular to the drawing. The inlet 12 and the outlet 13 are preferably formed into a slit shape. Moreover, a transfer mechanism 31 is provided which supplies an object to be heated of a magnetic loss material, a conductive material, or a composite material including a magnetic loss material or conductive material to a magnetic field region where in the cavity resonator 11 an electric field is minimum and magnetic field strength is maximum and uniform. The transfer mechanism 31 transfers a base 6 having a thin film pattern 7 being the object to be heated from the inlet 12 into a microwave irradiation space 51, and undergoes heat treatment. The treated base 6 is then transferred out from the outlet 13. The term "maximum" is a meaning also including a portion where the magnetic field strength at and around a maximum point is greater than other regions. For example, it is a region having equal to or greater than ¾ of the maximum value. Moreover, it can be also said that a "magnetic loss material, or a composite material including a magnetic loss material" is a "magnetic or conductive material, or a composite material including a magnetic or conductive material." Moreover, the thin film pattern 7 may be a single conductive pattern, or a collective pattern being a collection of a plurality of conductive patterns. Furthermore, the thin film pattern 7 may be a combined pattern including another pattern in a conductive pattern. The above term "base" is used with a meaning including a thin sheet shape such as paper or film and also a substrate/board such as a semiconductor substrate and a wiring board with a certain thickness.

Furthermore, an antenna 25 for suppling microwaves that form standing waves into the cavity resonator 11 is provided.

Examples of the magnetic loss material include iron, nickel, and cobalt. Examples of an alloy including an iron group element and a rare-earth element include Fe—Ni, Fe—Co, Fe—Ni—Co—Al, Fe—Ni—Cr, and MnAl, and examples of a compound include $SmCo_5$. Moreover, examples of an oxide include $Fe_3O_4$. The magnetic loss material is not limited to a magnetic substance, but conductive materials such as aluminum, copper, and tin are also materials producing magnetic loss due to eddy currents.

For example, in a case of the cylindrical cavity resonator 11 where a standing wave in $TM_{110}$ mode is generated, a magnetic field region 52 is a space where the magnetic field strength is maximum at the central axis C and is uniform along the central axis C. The base 6 where the thin film pattern 7 being the object to be heated is disposed is preferably disposed in such a manner as to pass the magnetic field region 52, that is, the central axis C. Moreover, the base 6 is preferably disposed in such a manner as to pass along a plane of symmetry of the cavity resonator. Therefore, the inlet 12 and the outlet 13 for the base 6 are preferably disposed at positions facing each other across the central axis C in the barrel portion walls 11SA and 11SB of the cylindrical cavity resonator 11. In other words, the inlet 12, the central axis C, and the outlet 13 are preferably disposed at positions including the same plane.

A microwave generator 21 is disposed for the cavity resonator 11 to supply microwaves to the cavity resonator 11. The S band ranging from 2 to 4 GHz is generally used for a microwave frequency. Alternatively, 900 to 930 MHz or 5.725 to 5.875 GHz may be used. However, other frequencies can also be used.

In the above microwave heating apparatus 10, a microwave generated by the microwave generator 21 for the cavity resonator 11 is supplied from a microwave supply port 14 into the cavity resonator 11 to form a standing wave at the position of the central axis C of the cavity resonator 11. For example, a coaxial waveguide converter type microwave supply port can be used for the microwave supply port 14. The base 6 including the object to be heated is heated at a portion where the magnetic field strength of the standing wave is maximum and the electric field strength is minimum (the central axis C of the cylindrical resonator 11).

Figure 2A:
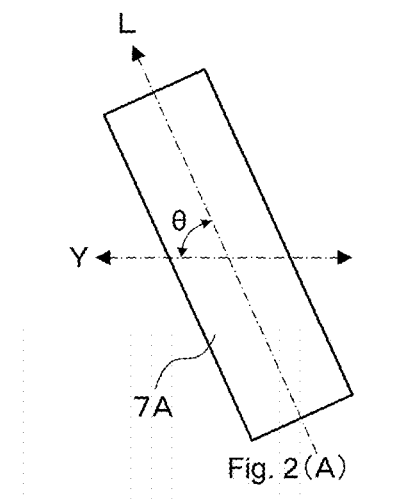
FIGS. 2(A) and 2(B) each are a plan view showing angles θA and θE between major axes LA and LE and an oscillation direction (Y direction) of a magnetic field H.
Figure 2B:
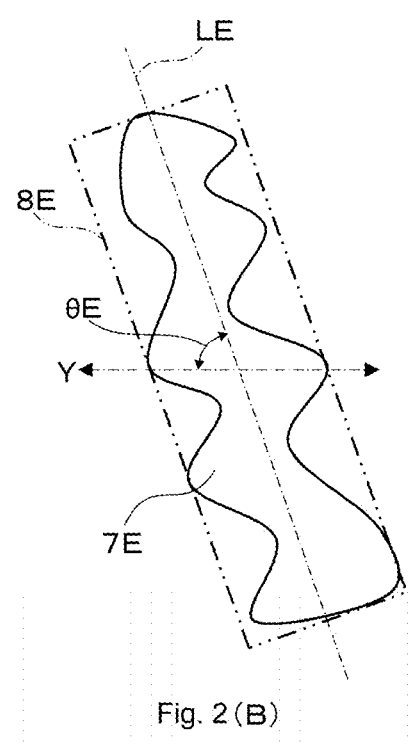

At this point in time, in the magnetic field region 52, at least a part in a major axis direction of the thin film pattern 7 of the base 6 is set at an angle equal to or greater than 45 degrees and equal to or less than 90 degrees with respect to the oscillation direction of a magnetic field generated in the magnetic field region 52, and is passed through the magnetic field region 52 to heat and fire the thin film pattern 7. At least a part in the major axis direction of the thin film pattern 7 is, for example, the thin film pattern 7 whose major axis L is disposed at an angle θ equal to or greater than 45 degrees and equal to or less than 90 degrees with respect to the oscillation direction (Y direction) of the magnetic field if a plurality of the thin film patterns 7 is disposed on the base 6, orienting their major axes L in different directions. The thin film pattern 7 (7A) shown in FIG. 2(A) can be cited as an example. An angle θA between a major axis LA of the thin film pattern 7A and the oscillation direction (Y direction) of the magnetic field is equal to or greater than 45 degrees and equal to or less than 90 degrees. Moreover, if the thin film pattern is a wavy line pattern or a polygonal line pattern, the thin film pattern is approximated into rectangular patterns. Among the approximated rectangular patterns, it is the thin film pattern 7 whose major axis L is disposed at the angle θ equal to or greater than 45 degrees and equal to or less than 90 degrees with respect to the oscillation direction of the magnetic field. The thin film pattern 7 (7E) of a wavy line pattern shown in FIG. 2(B) can be cited as an example. An angle θE of the thin film pattern 7E between a major axis LE of an approximated rectangular pattern 8E and the oscillation direction (Y direction) of the magnetic field is equal to or greater than 45 degrees and equal to or less than 90 degrees.

In the above microwave heating apparatus 10, a microwave that is supplied from the microwave generator 21 is adjusted in frequency, and then supplied. The adjustment of the frequency allows controlling the magnetic field strength distribution of a standing wave formed in the cavity resonator 11 into a desired distribution state, and adjusting the intensity of the standing wave by the output of the microwave. In other words, the heating state of the object to be heated can be controlled.

The frequency of a microwave that is supplied from the microwave supply port 14 can form a specific single-mode standing wave in the cavity resonator 11.

The constitution of the microwave heating apparatus 10 of the present invention will be described, in order.

<Cavity Resonator>

The cylindrical cavity resonator (cavity) 11 used for the microwave heating apparatus is not particularly limited as long as the cavity resonator 11 includes one microwave supply port 14 and forms a single-mode standing wave when a microwave is supplied. The cavity resonator used for the present invention is not limited to the cylindrical type shown in the drawings. In other words, the cavity resonator may be a cavity resonator of not the cylindrical type but a polygonal tube type having two parallel surfaces facing each other with the central axis as the center, excluding a tube type whose cross section in a direction perpendicular to the central axis is a rectangle. For example, the cavity resonator may be of a tube type of a regular even-sided polygon whose cross section in the direction perpendicular to the central axis is, for example, a regular hexagon, regular octagon, regular dodecagon, or regular hexadecagon, or a polygonal tube type of a shape obtained by crushing a tube type of a regular even-sided polygon between two surfaces facing across the central axis. In a case of the cavity resonator of the above polygonal tube type, corners inside the cavity resonator may be rounded. Moreover, a microwave irradiation space may be a cavity resonator having a space of, for example, a column or ellipsoid where the above roundness is increased, other than the above tube type.

Even such a polygon can realize effects similar to the cylindrical type (in other words, a standing wave whose magnetic field strength is maximum and uniform at the central axis can be formed).

A size of the cavity resonator 11 can be appropriately designed according to a purpose. The cavity resonator 11 desirably has a small electric resistivity, and is usually made of a metal, and as an example, use can be made of aluminum, copper, iron, magnesium, brass, stainless steel, an alloy thereof, or the like. Alternatively, a resin, ceramic, or metal surface may be coated by, for example, plating or vapor deposition with a material having a small electric resistivity. A material including silver, copper, gold, tin, or rhodium can be used for the coating.

<Transfer Mechanism>

A transfer mechanism 31 is not an essential mechanism, but includes a supply-side transfer unit 31A, a sending-side transfer unit 31B, or both of them.

The supply-side transfer unit 31A is configured including a pair of nip rolls 32A and 32B, one of which is provided with a rotation drive apparatus (not illustrated) that drives the nip roll. The rotation of the nip rolls 32A and 32B allows transferring the base 6 sandwiched between the nip rolls 32A and 32B into the cavity resonator 11. The sending-side transfer unit 31B is configured including a pair of nip rolls 33A and 33B, one of which is provided with a rotation drive apparatus (not illustrated) that drives the nip roll. The rotation of the nip rolls 33A and 33B allows transferring the base 6 sandwiched between the nip rolls 33A and 33B out of the cavity resonator 11. It is preferable that the supply-side transfer unit 31A and the sending-side transfer unit 31B always transfer the base 6 at a constant speed. Moreover, the circumferential speeds of the above nip rolls 32A, 32B, 33A, and 33B are preferably equal.

As another supply method, it is also possible to suspend a plate with small magnetic loss as a support (not illustrated) from the inlet 12 to the outlet 13 and place an object to be heated on the support. In this case, as means for moving an object to be heated, the support may be moved, or an object to be heated can be pressed in or pulled out.

Alternatively, the transfer mechanism 31, the inlet 12, and the outlet 13 may not be provided. In this case, it is possible to place an object to be heated in advance at a position where in the cavity resonator the magnetic field is maximum, treat the object to be heated for an appropriate time, and then stop a microwave, open a part of the cavity resonator, and take out the object to be heated.

Alternatively, it is also possible to move the cavity resonator itself without using a specific transfer mechanism as the transfer mechanism 31. In this case, it is suitable to fix an object to be heated in advance, and move the cavity resonator itself parallel to the object to be heated in such a manner as not to displace the position where in the cavity resonator the magnetic field is maximum from the object to be heated.

Alternatively, it is also possible to place the inlet 12 and the outlet 13 along the direction of gravity. In a case of a flexible object to be heated, the object to be heated droops with gravity; accordingly, the inlet 12 may be provided on the upper side to send out the object to be heated with gravity. Alternatively, the outlet 13 may be provided on the upper side to pull out the object to be heated against gravity.

The above transfer mechanism 31 is preferably capable of moving the above base 6 up and down in a direction perpendicular (for example, a vertical direction) to the oscillation direction of the magnetic field in the cavity resonator 11. In other words, the base 6 preferably moves up and down in a direction perpendicular (for example, a vertical direction) to the central axis C of the cavity resonator 11. In this manner, the base 6 moves up and down; accordingly, it is possible to prevent a thick device 9 from entering an electric field formation region where the strength of the electric field is strong. The vertical travel distance is preferably ±1 cm, more preferably ±3 cm, still more preferably ±5 cm from the central axis C of the cavity resonator 11. If it is possible to make a large movement, it is possible to cause even a considerably thick device to avoid the electric field formation region. Consequently, the generation of a spark can be prevented. Moreover, the heating states of an electrical connection electrode of the device and an electrode pattern being the thin film pattern 7 can be made uniform. The above configuration can be obtained by, for example, adding a height adjustable mechanism to the nip roll. In this case, the inlet 12 and the outlet 13 of the cavity resonator 11 need to be open with a size equal to the travel distance of the base 6 and the device 9. Moreover, the inlet 12 and the outlet 13 are preferably provided with a metal plate that narrows the openings of the inlet 12 and the outlet 13 in accordance with the vertical movement of, for example, the base 6 to prevent the leakage of a microwave.

<Microwave Supply>

It is preferable to provide a microwave generator 21, a microwave amplifier 22, an isolator 23, an impedance matcher 24, and an antenna 25, each for supplying the microwave.

The microwave supply port 14 is provided in or near a wall surface (an inner surface of the cylinder) parallel to the central axis C of the cavity resonator 11. In one embodiment, the microwave supply port 14 includes the antenna 25 that can apply a high frequency. FIG. 1 shows the microwave supply port 14 using a coaxial waveguide converter. In this case, the antenna 25 is an electric field driven monopole antenna. At this point, an iris (not illustrated) may be used as an appropriate opening between the microwave supply port 14 and the cavity resonator 11 to effectively form a standing wave. Moreover, the antenna may be installed directly on the cavity resonator 11 without using the microwave supply port 14. In this case, a loop antenna (not illustrated) serving as a magnetic field driven antenna may be installed near a side wall of the cavity resonator. Alternatively, it is also possible to install an electric field driven monopole antenna on a top surface or undersurface of the cavity resonator.

The antenna 25 receives the supply of a microwave from the microwave generator 21. Specifically, the microwave amplifier 22, the isolator 23, the matcher 24, and the antenna 25 are connected sequentially to the microwave generator 21 sequentially via cables 26 (26A, 26B, 26C, and 26D).

For example, a coaxial cable is used for each cable 26. In this configuration, a microwave emitted from the microwave generator 21 is supplied by the antenna 25 from the microwave supply port 14 into the cavity resonator 11 via the cables 26.

[Microwave Generator]

As the microwave generator 21 for use in the microwave heating apparatus 10 of the present invention, for example, use can be made of the microwave generator, such as a magnetron, or the microwave generator using a solid-state semiconductor device. From the viewpoint of capable of finely adjusting the microwave frequency, it is preferable to use the VCO (voltage-controlled oscillator), VCXO (voltage-controlled crystal oscillator), or PLL (phase-locked loop) oscillator.

[Microwave Amplifier]

The microwave heating apparatus 10, as shown in FIG. 1, includes a microwave amplifier 22. The microwave amplifier 22 has the function of amplifying the output of a microwave generated by the microwave generator 21. The configuration is not particularly restricted. However, for example, it is preferable to use a solid-state semiconductor device including a high-frequency transistor circuit. If one having a large oscillation output such as a magnetron is used as the microwave generator, it is also possible not to use a microwave amplifier circuit.

[Isolator]

The microwave heating apparatus 10, as shown in FIG. 1, includes an isolator 23. The isolator 23 prevents the influence of a reflected wave generated within the cavity resonator 11 and protects the microwave generator 21, and causes microwaves to be supplied in one direction (the antenna 25 direction). If there is no risk that the microwave amplifier 22 and the microwave generator 21 are damaged by reflected waves, it is not necessary to install the isolator. In this case, there are advantages of enabling reductions in the size of the apparatus and cost.

[Matcher]

The microwave heating apparatus 10, as shown in FIG. 1, includes the matcher 24. The matcher 24 matches (adjusts) the impedance from the microwave generator 21 to the isolator 23 and the impedance of the antenna 25. If there is no risk that the microwave amplifier 22 and the microwave generator 21 are damaged even when a reflected wave is generated due to a mismatch, it is not necessary to install the matcher. Alternatively, it is also possible not to install the matcher by adjusting the antenna structure, the circuit constant of the microwave amplifier 22, and the cables 26 in advance to prevent occurrence of a mismatch. In this case, there are advantages of enabling reductions in the size of the apparatus and cost.

[Antenna]

For the antenna 25, for example, use can be made of a monopole antenna, a loop antenna, or a patch antenna. In a case of a monopole antenna, an end of the antenna is exposed in the space, separated from a housing of the cavity resonator 11 or a housing of the microwave supply port via an insulator in such a manner as to cause the housing to function as a ground plane (not illustrated). In a case of a loop antenna, although not illustrated, an end of the loop antenna is connected to a ground potential such as a cavity resonator wall surface. A microwave (high frequency) is applied to the antenna 25; accordingly, it is possible to have a form where a magnetic field is excited in the loop and a standing wave is formed in the cavity resonator.

For example, if a $TM_{110}$ single-mode standing wave is formed in the above cylindrical cavity resonator, the magnetic field strength is maximum at the central axis C and is uniform in the central axis C direction. Therefore, an object to be heated, which is on a top surface of the base 6, or is the base itself, can be microwave-heated uniformly and highly efficiently.

<Control System>

The above microwave heating apparatus 10 is provided with a thermal image measurement apparatus (thermoviewer) 41, or a radiation thermometer (not illustrated), which measures the temperature of the base 6 including an object to be heated. The cavity resonator 11 is provided with a window 15 for measuring the temperature distribution of the base 6 with the thermal image measurement apparatus 41 or radiation thermometer (not illustrated). A measurement image of the temperature distribution of the base 6 measured by the thermal image measurement apparatus 41, or temperature information measured by the radiation thermometer, is transmitted to a control unit 43 via a cable 42. Furthermore, the barrel wall 11S of the cavity resonator 11 is provided with an electromagnetic wave sensor 44. A signal in accordance with electromagnetic field energy in the cavity resonator 11 detected by the electromagnetic wave sensor 44 is transmitted to the control unit 43 via a cable 45. The control unit 43 can detect the formation state (resonance state) of a standing wave generated in the cavity resonator 11 on the basis of the signal of the electromagnetic wave sensor 44. When a standing wave has been formed, that is, when resonance is occurring, the output of the electromagnetic wave sensor 44 increases. The oscillatory frequency of the microwave generator is adjusted in such a manner as to maximize the output of the electromagnetic wave sensor 44. Accordingly, it is possible to control the microwave frequency in such a manner as to agree with the resonance frequency of the cavity resonator 11. The resonance frequency changes depending on the state (for example, the insertion state and the temperature) of the object to be heated and, accordingly, the control needs to be performed at appropriate intervals. If the change is made quickly, if the object to be heated is supplied at high speed, and if the supply speed changes, it is desirable to control the microwave frequency at intervals of 1 millisecond to 1 second. If the change is small, for example, if the object to be heated is fixed, and if the supply speed does not change, it is desirable to perform the control at intervals of 10 seconds to 1 minute. Alternatively, there is also a case where if the resonance frequency is obtained once before heating, it is not necessary to always perform the control afterwards.

In the control unit 43, the frequency of a microwave at which a standing wave of a fixed frequency occurs in the cavity resonator 11 is fed back to the microwave generator 21 via a cable 46 on the basis of the detected frequency. The control unit 43 precisely controls the frequency of a microwave supplied from the microwave generator 21 on the basis of the feedback. A standing wave can be stably generated in the cavity resonator 11 in this manner. Therefore, the base 6 of the object to be heated can be uniformly heated by a standing wave with high efficiency and high repeatability. Moreover, the control unit 43 instructs the microwave amplifier 22 to output a microwave; accordingly, it is possible to make an adjustment in such a manner as to be able to supply a microwave of a fixed output to the antenna 25. Alternatively, it is also possible to adjust the attenuation factor of an attenuator (not illustrated) installed between the microwave generator 21 and the microwave amplifier 22 on an instruction of the control unit 43 without changing the amplification factor of the microwave amplifier 22. Feedback control may be performed on a microwave output to adjust the temperature of an object to be heated to a target temperature on the basis of an instructed value of the thermal image measurement apparatus 41 or the radiation thermometer. If an apparatus that can emit a large output, such as a magnetron, is used as the microwave oscillator 21, the control unit 43 may instruct the microwave generator 21 to adjust the microwave output.

As a control method that does not use the electromagnetic wave sensor 44, the magnitude of a reflected wave of the cavity resonator 11 may be measured to use a measurement value. The isolation amount obtained from the isolator 23 can be used to measure a reflected wave. Alternatively, a reflected signal obtained from a directional coupler (not illustrated) installed between the matcher 24 (if not installed, the cable 26D connected to the microwave supply port) and the isolator 23 can be used. The frequency of the microwave generator is adjusted in such a manner as to minimize a reflected wave signal; accordingly, microwave energy can be efficiently supplied to the cavity resonator 11. At this point, the resonance frequency of the cavity resonator 11 and the frequency of the microwave generator are highly likely to agree with each other. However, in this method, microwaves may be consumed by, for example, the cables 26, the antenna 25, and a waveguide. The frequency may not always agree with the resonance frequency.

<Heating of an Object to be Heated>

In the microwave heating apparatus 10 of the present invention, an object to be heated is a magnetic loss material, or a composite material including a magnetic loss material, that is, a magnetic or conductive material, or a composite material including a magnetic or conductive material. Such an object to be heated is disposed in accordance with the magnetic field strength inside the cavity resonator 11. Especially, when the object is disposed along the portion where the magnetic field strength of the standing wave formed in the cavity resonator 11 is locally maximized, more efficient heating can be performed. Specifically, the base 6 is supplied from the inlet 12 and transferred out from the outlet 13 in such a manner as to pass the central axis C of the cavity resonator 11.

It is desirable that the object to be heated do not pass the portion where the electric field strength is maximum. If a conductive material such as metal is placed in the electric field, for example, a spark discharge may occur, which may damage the object to be heated. As shown in FIG. 3(A), in terms of the electric field distribution of the $TM_{110}$ mode, the electric field strength is minimum on a horizontal plane passing the central axis C (if the microwave supply port 14 is placed on the lower side in the vertical direction). If the object to be heated is placed, or transferred in and out, along the plane, it is possible to prevent damage to the object to be heated due to the electric field. A guide for the region where the electric filed strength is minimum is, for example, ¼ compared with the portion where in the cavity resonator the electric field is maximum.

When having formed a standing wave in the cavity resonator 11, the above microwave heating apparatus 10 can cause the base 6 including the object to be heated to pass the position where in the cavity resonator 11 the magnetic field strength is maximum and uniform, and heat the base 6 efficiently, uniformly, and with high repeatability. Moreover, it is heating using a magnetic field. Accordingly, it is possible to heat the object to be heated efficiently, uniformly, and with high repeatability without generating a spark at the time of heating.

In the microwave heating apparatus 10 shown in FIG. 1, as long as being a magnetic loss material or conductive material, or a composite material including a magnetic loss material or conductive material, an object to be heated is not particularly limited, and a liquid, solid, powder, and a mixture thereof can be heated.

If the object to be heated is a liquid, solid, or powder, it is disposed on the base, and transferred. Accordingly, it is possible to continuously control the temperature of the object to be heated. The microwave heating apparatus 10 of the present invention can selectively heat the object to be heated on the base. For example, solder on a substrate can be selectively heated. Since progress of many chemical reactions can be controlled by temperature, the microwave heating apparatus 10 of the present invention is preferably used for controlling the chemical reactions.

The object to be heated itself may be able to maintain a sheet shape. If the object to be heated is, for example, a fibrous solid, it can be transferred without a support such as a sheet.

Moreover, if the object to be heated is a catalyst, as described below, the microwave heating apparatus 10 of the present invention can be used as a chemical reaction apparatus to cause a chemical reaction due to the action of the catalyst. It is also preferable that the catalyst have a form supported by the base.

Examples of the chemical reactions include: transfer reaction, substitution reaction, addition reaction, cyclization reaction, reduction reaction, oxidation reaction, selective catalytic reduction reaction, selective oxidation reaction, racemization reaction, cleavage reaction, catalytic cracking reaction (cracking) and the like, and are not limited thereto, but include various chemical reactions.

In a chemical reaction method of the present invention, conditions, such as a reaction time, a reaction temperature, a reaction substrate, and a reaction medium, can be appropriately set according to a target chemical reaction. For example, chemical reaction conditions can be appropriately set, with reference to Chemistry Handbook (edited by Shuichi Suzuki and Mitsuaki Mukaiyama, Asakura Publishing Co., Ltd., 2005), Microwave Chemical Process Technology II (supervised by Kazuhiko Takeuchi, Yuji Wada, CMC Publishing, 2013), JP-A-2010-215677, and the like.

In the embodiment shown in FIG. 1, the frequency of the standing wave is not particularly limited as long as the standing wave can be formed in the cavity resonator 11. For example, when the microwave is supplied from the microwave supply port 14, the frequency is preferably set to a frequency at which the above-described standing wave in $TM_{110}$ mode is formed in the cavity resonator 11. Other than the above standing wave in $TM_{110}$ mode, examples of modes include $TM_{210}$, $TM_{310}$, and $TM_{410}$. A standing wave in $TM_{110}$ is the most preferable in the respect that the portion of the maximum magnetic field strength can be efficiently formed along the central axis C of the cavity resonator 11. Alternatively, a $TE_{10n}$ (n is an integer of 1 or more) mode is also acceptable. Also in this case, a $TE_{101}$ mode where n=1 is the most preferable, or for example, $TE_{102}$ and $TE_{103}$ modes are also acceptable.

Moreover, if the object to be heated is a conductive material, it is undesirable that the object to be heated pass the portion where the electric field is concentrated. Accordingly, the $TM_{110}$ mode that allows forming a plane where the electric field strength is minimum on a plane passing the portion of the maximum magnetic field strength is especially preferable. In this manner, the object to be heated is caused to pass along the plane where the electric field strength is minimum; accordingly, the destruction of the object to be heated due to the electric field does not occur.

If a cube, or a cuboid whose cross section in a direction perpendicular to the central axis is a square, is used as the cavity resonator, $TE_{10n}$ (n is an integer of 2 or more) can also similarly form an electromagnetic wave irradiation space having a portion of the maximum magnetic field strength.

It is preferable that means for forming a standing wave in $TM_{110}$ mode have a mechanism that controls the frequency of a microwave to always maintain a uniform magnetic field distribution state along the cylinder central axis C in a state where the object to be heated is inserted in the cavity resonator 11 (the microwave irradiation space). Alternatively, it is preferable that means for forming a standing wave in $TM_{110}$ mode have a mechanism that controls the shape of the microwave irradiation space.

Specifically, the mechanism that controls the frequency of a microwave detects a resonance frequency that agrees with the standing wave in $TM_{110}$ mode that changes in accordance with the insertion state of the object to be heated and applies a microwave that agrees with the resonance frequency.

The resonance state of the $TM_{110}$ mode is a state where energy is being efficiently supplied into the cavity resonator 11. At this point, in terms of the output of the electromagnetic wave sensor 44 installed on the side wall of the cavity resonator, a signal proportional to the intensity of energy in the cavity resonator 11 is outputted. Accordingly, it is simply required to adjust the oscillatory frequency of the microwave generator 21 in such a manner as to maximize the signal output. As an adjustment method, if the oscillatory frequency of the microwave generator 21 is swept within a fixed range (100 MHz as an example), it is possible to obtain a spectrum where a peak arises in the output of the electromagnetic wave sensor 44 at a point that agrees with the resonance frequency. The spectrum is visually compared with a theoretical resonance frequency derived from, for example, the shape of the cavity resonator; accordingly, it is possible to identify the resonance frequency of the $TM_{110}$ mode. After once the resonance frequency is identified, the oscillatory frequency of the microwave generator 21 is regularly swept near the resonance frequency within a narrow range (5 MHz as an example). Accordingly, it is possible to track a change in the $TM_{110}$ mode resonance frequency resulting from a change (for example, the insertion amount or temperature) of the object to be heated. Hence, it is possible to always maintain the optimum microwave irradiation condition. It is desirable to appropriately monitor the interval for tracking the resonance frequency and a sweep width in accordance with the speed and amount (the supply speed, the amount of change in temperature, and uniformity) of a change of the object to be heated.

As another method for measuring the intensity of energy in the cavity resonator, there is a method that uses the intensity of a reflected wave from the antenna 25 for microwave irradiation. In this case, the fact that a reflected wave is reduced in a state where the intensity of energy in the cavity resonator is high is used. Specifically, the oscillatory frequency of the microwave generator results in being adjusted in such a manner as to minimize the intensity of a reflected wave.

However, in the method by a reflected wave, other than the cavity resonator, a plurality of factors such as the antenna 25, the matcher 24, the microwave irradiation port 14, and the cables 26 add up to a change in signal intensity. If precise control is required, it is preferable to use the electromagnetic wave sensor 44 that is attached directly to the cavity resonator.

As another method for causing the resonance frequency of the cavity resonator 11 and the oscillatory frequency of the microwave generator to agree with each other, there is a method that changes the shape of the microwave irradiation space and adjusts the resonance frequency. Specifically, a dielectric or a metal piece is inserted into the cavity resonance cavity resonator; accordingly, it is possible to adjust the resonance frequency. If a dielectric (not illustrated) with small microwave absorption such as ceramic or Teflon (registered trademark) is inserted into the cavity resonator 11, the resonance frequency changes in a lower direction in accordance with the permittivity and insertion amount of the dielectric. If a metal piece such as aluminum or copper is inserted instead of a dielectric, the resonance frequency changes in a higher direction. The use of a mechanism that adjusts the insertion amount automatically allows causing the resonance frequency and the oscillatory frequency of the microwave generator to agree with each other even if the oscillatory frequency of the microwave generator cannot be changed as in a magnetron.

However, the position where the magnetic field is maximized when a dielectric or a metal is inserted into the cavity resonator 11 also moves in accordance with the insertion amount/insertion position. Hence, it is desirable to appropriately control the position to supply the object to be heated.

As described above, it is preferable to cause the frequency of a microwave applied from the microwave generator and the resonance frequency to agree with each other by controlling the insertion amount of a dielectric or a metal into the microwave irradiation space in the cavity resonator 11, or by including the mechanism that adjusts a resonance frequency that agrees with a standing wave in $TM_{110}$ mode.

The cavity resonator 11 is preferably designed so that the resonance frequency is within an ISM band. Further, since the resonance frequency varies due to a change in temperature or a change in composition of the object to be heated, the resonance frequency is preferably within the ISM band in consideration of its variation range. "ISM" is an abbreviation of Industry Science Medical, and the ISM band is a frequency band allocated for general use in industrial, scientific, and medical fields. However, if electromagnetic wave radiation into the space is prevented, for example, by taking measures for leakage of electromagnetic waves (the installation of an electromagnetic wave absorber, the design of the opening of the cavity resonator where a cutoff frequency is considered, and the installation of a choke structure) at the opening, or by installing the cavity resonator in a shielded space, the resonance frequency is not limited to the ISM band.

When, in the above microwave heating apparatus 10, a microwave is supplied into the cavity resonator 11 and a specific standing wave is formed, it is possible to generate a magnetic field at the central axis C of the cavity resonator 11 and maximize the magnetic field, and also it is possible to uniformly distribute the magnetic field in the central axis direction. Hence, when the base 6 including the object to be heated of a magnetic loss material or a composite material including a magnetic loss material is transferred in from the inlet 12 and then out from the outlet 13 through the central axis C, the magnetic field that is maximum at the central axis C can be uniformly applied in a direction of the width of the base 6. Hence, an induced current is generated in the magnetic loss material by the application of the magnetic field, which heats the magnetic loss material by induction.

In the above heating, if the base 6 comprises paper, and an object to be heated comprising a magnetic loss material (conductive material) is disposed on the paper, the object to be heated is heated, but the paper base 6 is not heated. Generally, paper includes water even in a dry state. Even if a magnetic field is applied, an induced current is not generated in the paper including water and therefore the base 6 is not heated. On the other hand, an induced current is generated in the object to be heated and therefore the object to be heated is heated. In this manner, the object to be heated can be selectively heated.

Moreover, if, in the above heating, the base 6 comprises resin (for example, polyethylene terephthalate), and the thin film pattern (for example, electrode pattern) 7 comprising a conductive material is disposed on the base 6, the electrode pattern 7 is heated but the resin base 6 is not heated. Generally, magnetic loss hardly occurs in resin, and an induced current is not generated in resin even if a magnetic field is applied. Therefore, the base 6 is not heated. On the other hand, an induced current is generated in the electrode pattern 7; therefore, the electrode pattern 7 is heated. In this manner, the electrode pattern 7 can be selectively heated. The heating of the electrode pattern 7 allows heating and melting solder 8, connecting an electrical connection electrode (not illustrated) of a device 9 to the electrode pattern 7 via the solder 8, and mounting the device 9.

Furthermore, although not illustrated, if, in the above heating, the base 6 includes a sheet of resin (for example, polyimide), and the thin film pattern 7 comprising a conductive material is disposed on the base 6, the thin film pattern 7 is heated but the resin base 6 is not heated. Generally, magnetic loss hardly occurs in resin, and an induced current is not generated in resin even if a magnetic field is applied. Therefore, the base 6 is not heated. On the other hand, an induced current is generated in the thin film pattern 7; therefore, the thin film pattern 7 is heated. In this manner, the thin film pattern 7 can be selectively heated.

The cylinder central axis C portion has the minimum electric field strength (refer to the electric field distribution map in FIG. 3(A)), and has the maximum magnetic field strength (refer to the magnetic field distribution map in FIG. 3(B)).

As described above, in the microwave heating apparatus 10, for example, the use of the cylindrical cavity resonator 11 that forms a standing wave in $TM_{110}$ mode allows a magnetic field to be concentrated at the central axis C. Accordingly, this region becomes a region where the magnetic field strength is maximum, and the magnetic field strength is uniform in the central axis direction. Hence, the controllability (uniformity) of the temperature of an object to be heated that passes the central axis C increases. Moreover, the frequency and output of a microwave that forms a standing wave is controlled; accordingly, a constant standing wave can be always formed. Hence, temperature controllability is further improved and further uniform heating can be realized.

The electromagnetic wave sensor 44 can correctly detect a signal in accordance with electromagnetic field energy in the cavity resonator 11. Hence, the formation state (resonance state) of a standing wave that has been generated in the cavity resonator 11 on the basis of the detected signal in accordance with the electromagnetic field energy can be detected. The control unit controls the frequency of a microwave in such a manner as to cause stable resonance on the basis of the detection information. In this manner, it is possible to stably generate a standing wave in the cavity resonator 11. Therefore, it is possible to efficiently and uniformly heat an object to be heated with the standing wave and stably maintain the formation state of the standing wave in the cavity resonator.

A preferred example of a microwave heating method using microwaves, the method using the above microwave heating apparatus, is described below.

As shown in FIG. 1 above, the microwave heating method forms a single-mode standing wave in the cavity resonator 11 of the microwave heating apparatus 10, controlling the frequency of a microwave. As described above, in terms of the frequency of a microwave, a signal in accordance with the electromagnetic field energy in the cavity resonator 11 detected by the electromagnetic wave sensor 44 is transmitted to the control unit 43. The control unit 43 detects the resonance state of a standing wave generated in the cavity resonator 11 on the basis of the signal of the electromagnetic wave sensor 44. Occurrence of resonance indicates formation of a standing wave, and the output of the electromagnetic wave sensor 44 increases. The oscillatory frequency of the microwave generator is adjusted in such a manner as to maximize the output of the electromagnetic wave sensor 44; accordingly, the microwave frequency is controlled in such a manner as to agree with the resonance frequency of the cavity resonator 11.

The control of the microwave frequency allows forming a standing wave in such a manner as to cause the microwave frequency to agree with the resonance frequency of the cavity resonator. An object to be heated is disposed in a magnetic field region where the strength of a magnetic field formed by the standing wave is uniform and maximum.

Magnetic heat generation due to magnetic loss caused by the action of the magnetic field in the magnetic field region, and/or induction heating by an induced current generated in the object to be heated due to the magnetic field in the magnetic field region allows heating the object to be heated.

Next, a soldering and mounting technique using the microwave heating method is described. The execution of a heating process for melting solder is essential for the soldering and mounting technique upon device fabrication. It is necessary to heat the mounting location or the entire base to a temperature equal to or greater than the melting point in accordance with the composition of the solder. Hence, failures such as the deformation and degradation of the base due to thermal damage upon soldering and mounting are likely to occur in the base with low heat resistance, and there are constraints on the use of solder.

Moreover, low-temperature curing conductive adhesive has, for example, a problem that the lower the curing temperature the more time it takes for firing, and it cannot be said that reliability is sufficient. Therefore, the low-temperature curing conductive adhesive has not been generally used yet.

Moreover, in recent years, a hybrid device where a device is mounted on a fabric or a stretchable base has received attention as a device with a high human affinity and degree of freedom in installation. In order to speedily commercialize the hybrid device, it is desirable to mount the device using solder whose reliability has already been established. However, as described above, a base with low heat resistance has the problem of thermal damage due to the high temperature process upon soldering and mounting. Hence, the development of an innovative processing technique that allows performing highly reliable soldering and mounting on a low heat resistance base has been urgently necessary.

In this manner, a process that allows soldering and mounting that has conventionally been regarded as impossible is expected for a hybrid device that is mounted on a high molecular substrate with low heat resistance and stretchability.

A soldering and mounting apparatus suitable to perform a soldering and mounting method using the microwave heating apparatus 10 of the present invention is described below. As a preferred embodiment of the soldering and mounting apparatus, a soldering and mounting apparatus including the microwave heating apparatus having the cylindrical cavity resonator described with FIG. 1 above is described.

As shown in FIG. 4, a soldering and mounting apparatus 1 includes first group apparatus 2 to fourth group apparatus 5. The first group apparatus 2 includes a primer/adhesive layer printing apparatus that prints a primer/adhesive layer on the base, a drying apparatus, and an electrode pattern printing apparatus that forms the electrode pattern 7 and a drying apparatus. The second group apparatus 3 includes a solder paste application apparatus that applies solder paste 8 forming solder, a device mounting apparatus that mounts the device 9, and a microwave irradiation condition determination apparatus that controls a microwave irradiation condition automatically in accordance with the shape of a heating target by, for example, an image recognition process. Moreover, the third group apparatus 4 is the microwave heating apparatus 10 of the present invention, and includes the cavity resonator. Furthermore, the fourth group apparatus 5 (also referred to as the downstream apparatus) that performs postprocessing. These apparatuses are preferably disposed in the order of the first group apparatus 2, the second group apparatus 3, the third group apparatus 4, and the fourth group apparatus 5. Alternatively, it is also preferable that the first group apparatus 2 to the fourth group apparatus 5 be disposed around a transfer apparatus (not illustrated).

An example of the apparatus placement of the soldering and mounting apparatus 1 is described below with reference to FIG. 5.

Figure 5:
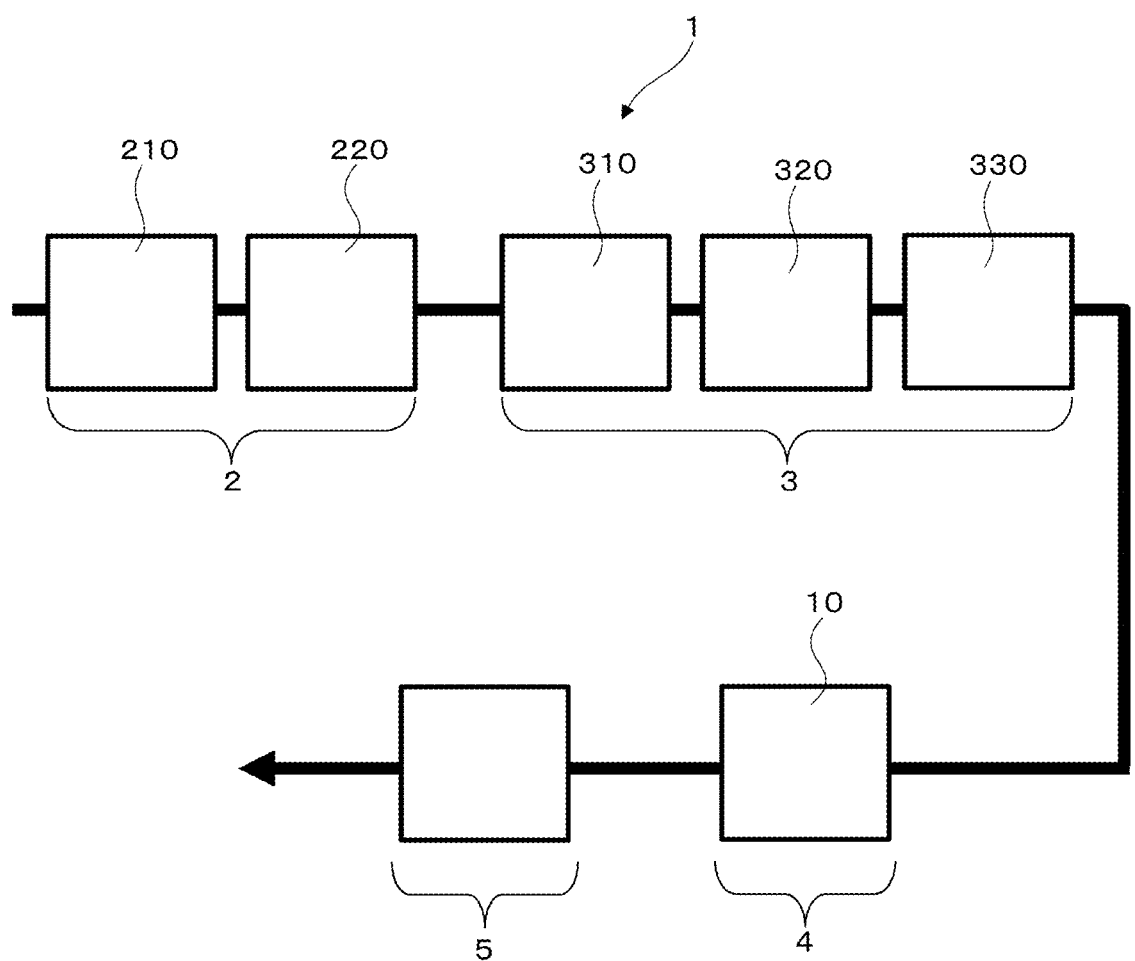
FIG. 5 is a block diagram schematically showing a detailed example of a preferred entire configuration of the soldering and mounting apparatus of the present invention.

As shown in FIG. 5, the first group apparatus 2 of the soldering and mounting apparatus 1 preferably includes an application apparatus 210 and a drying apparats 220. The application apparatus 210 preferably includes the above primer/adhesive layer printing apparatus and electrode pattern printing apparatus. The primer/adhesive layer printing has the effect of improving adhesion between the base 6, the electrode pattern 7, and the device 9. Moreover, the drying apparatus 220 preferably includes a drying apparatus that performs a drying step after printing the primer/adhesive layer printing and a drying step after printing the electrode pattern. Furthermore, the first group apparatus 2 may include, for example, a screen printing apparatus (not illustrated) that prints a solder resist pattern, and may include a drying apparatus (not illustrated) that dries the printed solder resist pattern. Examples of the above drying apparatuses include heating apparatuses such as an infrared heating apparatus, a hot air heating apparatus, and a hot plate. The above drying apparatus can also be shared.

The second group apparatus 3 preferably includes a solder paste application apparatus 310, a device mounting apparatus 320, and a microwave irradiation condition determination apparatus 330. The solder paste application apparatus 310 prints a solder paste pattern to be the solder 8 (refer to FIG. 4) on the electrode pattern 7 (refer to FIG. 4), and forms the solder 8. The solder paste application apparatus 310 preferably includes, for example, a stencil printing apparatus, a screen printing apparatus, or a dispenser apparatus. The device mounting apparatus 320 mounts the device 9 (refer to FIG. 1) on the electrode pattern 7 via the solder 8 before melting. The microwave irradiation condition determination apparatus 330 determines the shapes of the electrode pattern 7 (refer to FIG. 4) and the mounted device 9 (refer to FIG. 4) by, for example, the image recognition process and provides the optimum microwave irradiation condition to the microwave heating apparatus 10 in accordance with the shape of a heating target.

It is suitable for the third group apparatus 4 to use the microwave heating apparatus 10 described with reference to FIG. 1 above, the microwave heating apparatus 10 including one or more cavity resonators. A case of using one cavity resonator is described below. However, two or more (a plurality of) cavity resonators may be disposed in series.

The fourth group apparatus 5 is preferably configured including a cleaning apparatus (not illustrated) that removes flux after firing and an application apparatus (not illustrated) that performs the subsequent adhesive application step, and a curing apparatus (not illustrated). Examples of the adhesive application apparatus include a stencil printing apparatus, a screen printing apparatus, or a dispenser apparatus. Furthermore, the curing apparatus cures an adhesive, and is, for example, an ultraviolet lamp, an infrared lamp, a hot air apparatus, a hot plate, atmospheric-pressure plasma irradiation means or a xenon flash lamp, or a high humidity chamber. The above adhesive is classified into, for example, a heat curing type, a light (including ultraviolet light) curing type, or a moisture curing type. It is preferable to use the above different curing apparatuses to promote curing of the adhesive.

The base 6 including the electrode pattern 7 is transferred by the transfer mechanism (not illustrated) in the order of the upstream first apparatus (the first group apparatus 2), the upstream second apparatus (the second group apparatus 3), the microwave heating apparatus (the third group apparatus 4), and the downstream apparatus (the fourth group apparatus 5). Each apparatus continuously performs a process on each pattern of the base 6.

Next, the soldering and mounting apparatus using the microwave heating apparatus is described. Firstly, the specific apparatus placement of the soldering and mounting apparatus 1 is described with reference to FIGS. 6 to 8.

The term "mounting" in the description means the technique to attach a device to an electrode pattern disposed on a base.

Figure 6:
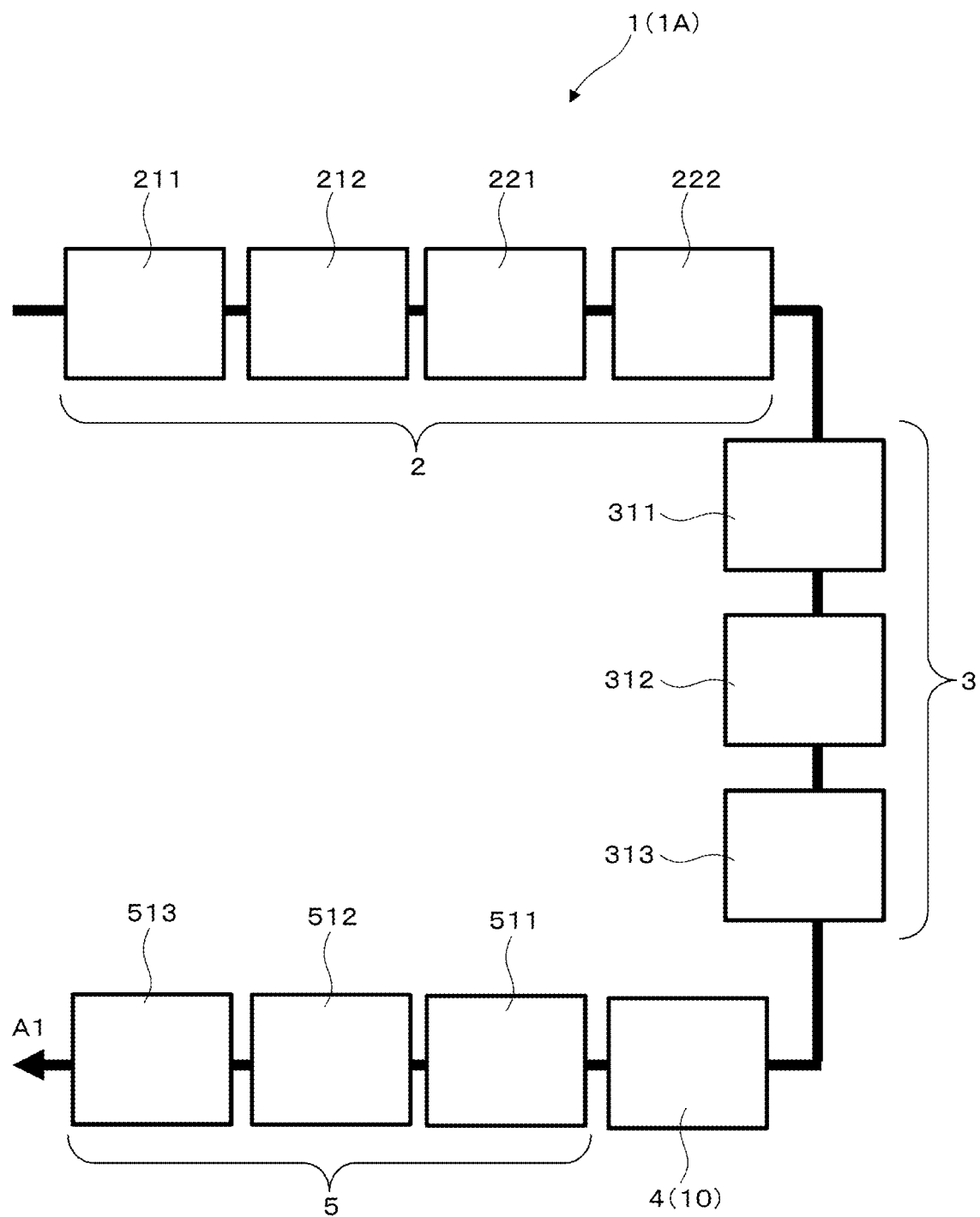
FIG. 6 is a block diagram showing a preferred example of a specific apparatus placement of the microwave heating apparatus (soldering and mounting apparatus) of the present invention.

As shown in FIG. 6, in the soldering and mounting apparatus 1 (1A), each apparatus is preferably placed as follows:

In the first group apparatus 2, a primer/adhesive layer printing apparatus 211, a drying apparatus 212, an electrode pattern printing apparatus 221, and a drying apparatus 222 are disposed in this order. Furthermore, although not illustrated, a solder resist pattern printing apparatus that prints a solder resist pattern and a drying apparatus for the printed solder resist pattern are preferably disposed downstream of the drying apparatus 222.

In the second group apparatus 3, a solder paste application apparatus 311, a device mounting apparatus 312, and a microwave irradiation condition determination apparatus 313 are disposed in this order.

In the third group apparatus 4, the microwave heating apparatus 10 including one or more cavity resonators is disposed.

In the fourth group apparatus 5, a cleaning apparatus as a flux removal apparatus 511, and an adhesive application apparatus 512, and an adhesive curing apparatus (curing apparatus) 513 are disposed in this order.

The above soldering and mounting apparatus 1 (1A) operates as follows:

The base 6 (refer to FIG. 4) including the electrode pattern 7 (refer to FIG. 4) is transferred by the transfer mechanism (not illustrated) in a direction indicated by an arrow A1. A process corresponding to each apparatus is performed sequentially by the apparatus. The electrode connection electrode of the device 9 is connected onto the electrode pattern 7 formed on the base 6 via the solder 8. The device 9 is soldered and mounted. In the drawing, the arrow portion hidden behind the square indicating the apparatus indicates that the process is performed by the apparatus. The arrow does not bend in the apparatus (hereinafter the same).

The term "device" in the description is used with meanings including passive components such as resistors, capacitors, and inductors, further including sensors such as various measurement components and imaging components, optical components such as light receiving devices and light emitting devices, and acoustic elements, in addition to electronic devices such as semiconductor devices and integrated circuits (IC).

Figure 7:
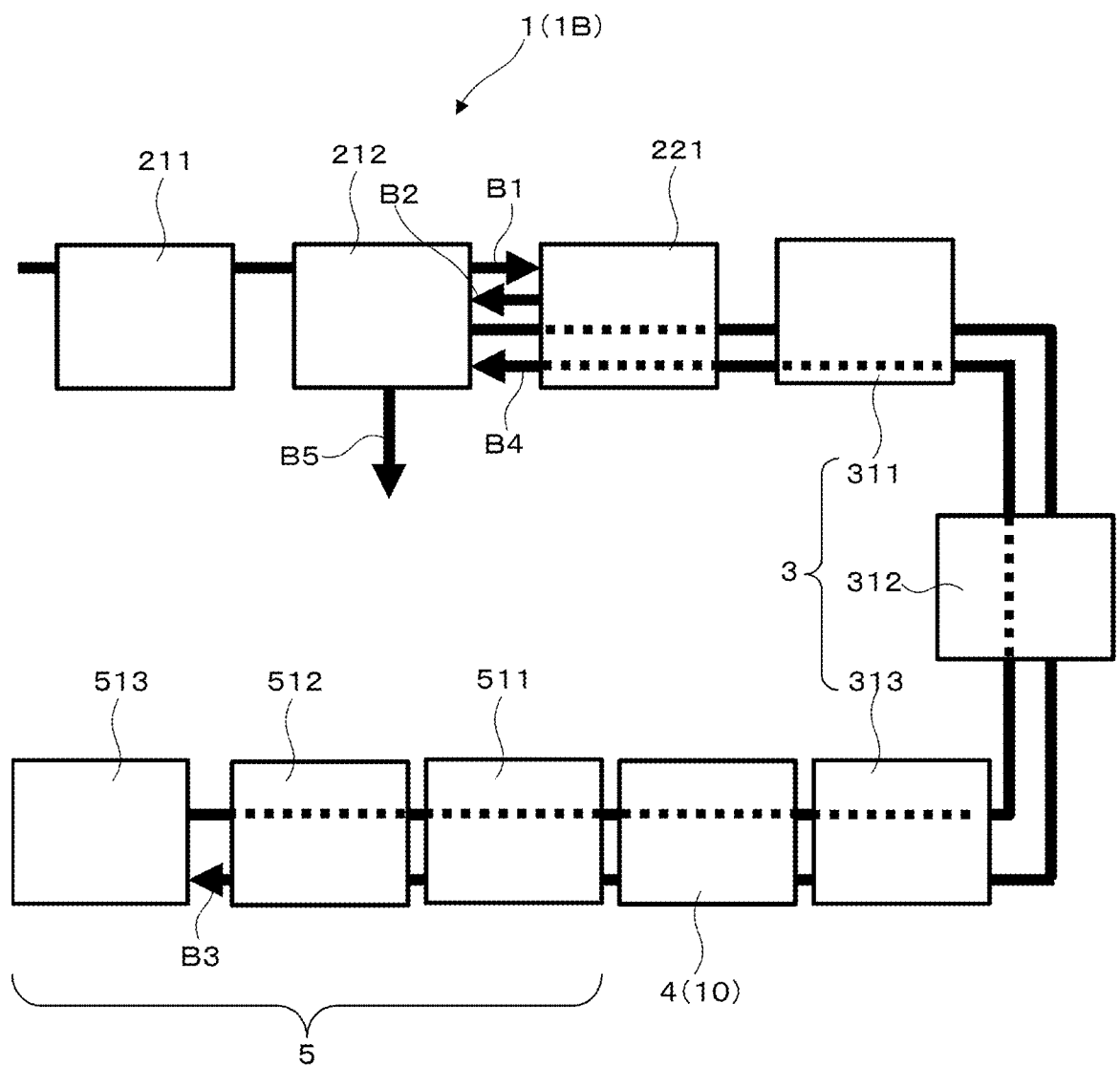
FIG. 7 is a block diagram showing another preferred example of a specific apparatus placement of the microwave heating apparatus (soldering and mounting apparatus) of the present invention.

As shown in FIG. 7, in the soldering and mounting apparatus 1 (1B), each apparatus is preferably placed as follows:

In the first group apparatus 2, a primer/adhesive layer printing apparatus 211, a drying apparatus 212, and an electrode pattern printing apparatus 221 are disposed in this order. Furthermore, although not illustrated, a solder resist pattern printing apparatus that prints a solder resist pattern is preferably disposed.

In the second group apparatus 3, a solder paste application apparatus 311, a device mounting apparatus 312, and a microwave irradiation condition determination apparatus 313 are disposed in this order.

In the third group apparatus 4, the microwave heating apparatus including one or more cavity resonators is disposed. It is preferable that the above-described microwave heating apparatus 10 is used for the third group apparatus 4.

In the fourth group apparatus 5, a cleaning apparatus, as a flux removal apparatus 511, and an adhesive application apparatus 512, and a curing apparatus 513 are disposed in this order.

The above soldering and mounting apparatus 1 (1B) operates as follows:

The base 6 (refer to FIG. 4) including the electrode pattern 7 (refer to FIG. 4) is transferred by the transfer mechanism (not illustrated) in a direction indicated by an arrow B1, and undergoes a process corresponding to each apparatus in the order of the primer/adhesive layer printing apparatus 211, the drying apparatus 212, and the electrode pattern printing apparatus 221.

After the electrode pattern is printed, the base 6 is sent from the electrode pattern printing apparatus 221 to the drying apparatus 212 as indicated by an arrow B2. The printed electrode pattern is then dried.

Next, as indicated by an arrow B3, the base 6 undergoes a process corresponding to each apparatus in the order of the solder paste application apparatus 311, the device mounting apparatus 312, the microwave irradiation condition determination apparatus 313, the microwave heating apparatus 10 of the third group apparatus 4, the flux removal apparatus 511, and the adhesive application apparatus 512 after the drying apparatus 212. In the drawing, the portion indicated by the dotted line indicates that the process of the apparatus where the dotted line is drawn is not performed (hereinafter the same).

Furthermore, the base 6 is sent from the adhesive application apparatus 512 to the curing apparatus 513 to cure the applied adhesive. After the adhesive is cured, the base 6 is taken out from the curing apparatus 513 as in the soldering and mounting apparatus 1A. Alternatively, after the adhesive is applied by the adhesive application apparatus 512, the base 6 may be sent to the drying apparatus 212 without passing through the curing apparatus 513 as indicated by an arrow B4 and, after the adhesive is dried (cured), the base 6 may be taken out from the drying apparatus 212 as indicated by an arrow B5. In this case, the curing apparatus 513 may not be disposed.

In this way, the electrode connection electrode of the device 9 is connected onto the electrode pattern 7 formed on the base 6 via the solder 8, and the device 9 is soldered and mounted.

Figure 8:
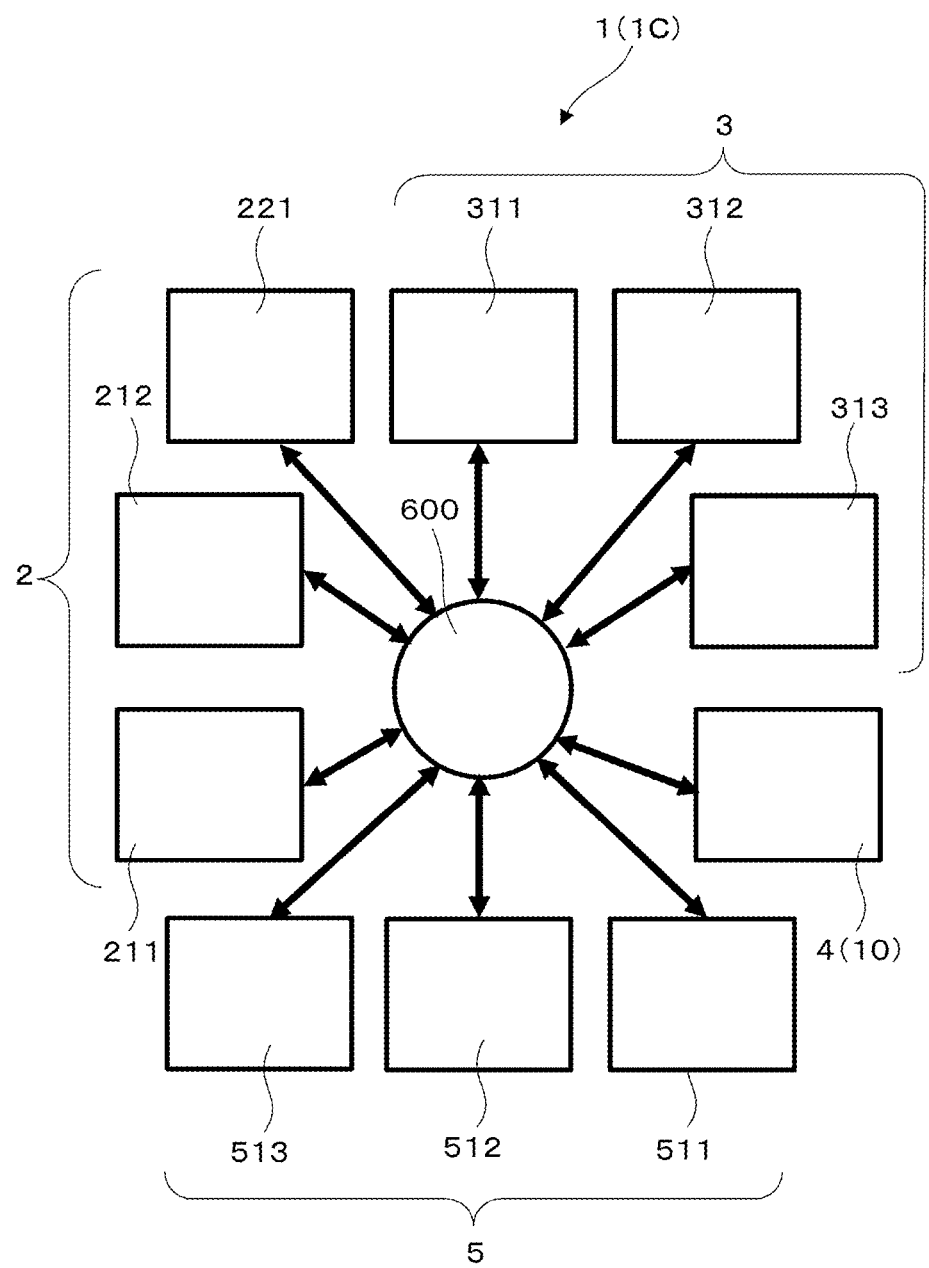
FIG. 8 is a block diagram showing still another preferred example of a specific apparatus placement of the microwave heating apparatus (soldering and mounting apparatus) of the present invention.

As shown in FIG. 8, in the soldering and mounting apparatus 1 (1C), each apparatus is preferably placed as follows:

In the first group apparatus 2, a primer/adhesive layer printing apparatus 211, a drying apparatus 212, and an electrode pattern printing apparatus 221 are disposed in this order. Furthermore, a solder resist pattern printing apparatus that prints a solder resist pattern and a drying apparatus for the printed solder resist pattern are preferably disposed.

In the second group apparatus 3, a solder paste application apparatus 311, a device mounting apparatus 312, and a microwave irradiation condition determination apparatus 313 are disposed in this order.

In the third group apparatus 4, the microwave heating apparatus 10 including one or more cavity resonators is disposed.

In the fourth group apparatus 5, a flux removal apparatus 511, an adhesive application apparatus 512, and a curing apparatus 513 are disposed in this order.

The above soldering and mounting apparatus 1 (1C) operates as follows:

The base 6 (refer to FIG. 4) including the electrode pattern 7 (refer to FIG. 4) is housed in an unillustrated housing unit. The base 6 before processing housed in the housing unit is transferred by a transfer mechanism 600 to the primer/adhesive layer printing apparatus 211. After primer/adhesive layer printing by the apparatus, the base 6 is transferred to and dried in the drying apparatus 212. The transfer by the transfer apparatus 600 allows transferring the base 6 to the electrode pattern printing apparatus 221 to print the electrode pattern. The base 6 is transferred to the drying apparatus 212 to dry the primer/adhesive layer print. Next, the base 6 is transferred by the transfer mechanism 600 to the unillustrated solder resist pattern printing apparatus. After a solder resist pattern is printed by the solder resist pattern printing apparatus, the base 6 is further transferred to the drying apparatus 212 to dry the solder resist pattern.

Next, the base 6 is transferred by the transfer mechanism 600 to the solder paste application apparatus 311 of the second group apparatus 3. After the solder paste application apparatus 311 applies the solder paste to the base 6, the base 6 is further transferred to the device mounting apparatus 312. The electrode connection electrode of the device 9 (refer to FIG. 4) is connected by the device mounting apparatus 312 via the solder 8 (refer to FIG. 4) on the electrode pattern 7 to mount the device 9. The base 6 is further transferred to the microwave irradiation condition determination apparatus 313. The optimum microwave irradiation condition for the shape of the heating target is determined by, for example, the image recognition process.

Next, the base 6 is transferred by the transfer mechanism 600 to the microwave heating apparatus 10 of the third group apparatus 4 to melt and solidify the solder. The electrode connection electrode of the device 9 is connected to the electrode pattern 7 via the solder 8.

Next, the base 6 is transferred by the transfer mechanism 600 to the flux removal apparatus 511 to remove flux. The base 6 is further transferred to the adhesive application apparatus 512 to apply an adhesive to the base 6. The base 6 is then sent to the curing apparatus 513 to cure the applied adhesive. After curing, the base 6 is taken out by the transfer mechanism 600 to a predetermined position of the housing unit.

If the drying apparatus 212 is capable of curing the adhesive, the drying apparatus 212 may cure the adhesive without using the curing apparatus 513.

In this way, the electrode connection electrode of the device 9 is connected onto the electrode pattern 7 formed on the base 6 via the solder 8, and the device 9 is soldered and mounted.

Next, a preferred embodiment of the soldering and mounting method of the present invention is described with reference to FIGS. 1, 4, and 5 described above.

The soldering and mounting method of the present invention is preferably performed using the microwave heating apparatus 10 described above.

As in the above description, the first group apparatus 2 prints the primer/adhesive layer on the surface of the base 6 in advance to increase adhesion between the base 6 and the electrode pattern 7 to be formed. A silver paste pattern for forming the electrode pattern 7 is formed on the surface of the base 6 where the primer/adhesive layer has been printed, and then dried to obtain the electrode pattern 7. Furthermore, a solder resist pattern is formed by the second group apparatus 3 and then dried.

Next, a solder paste pattern to be the solder 8 is formed by the second group apparatus 3 on the electrode pattern 7, and then dried. Furthermore, the device 9 to be mounted is mounted on the solder 8 before melting.

Next, the third group apparatus 4 (the microwave heating apparatus 10) performs magnetic field heating. The solder paste pattern (solder) is melted and then solidified. The electrode pattern 7 and the electrical connection electrode (not illustrated) of the device are electrically connected via the solder.

Specifically, a single-mode standing wave where a magnetic field and an electric field are separated is formed in the microwave irradiation space 51 of the cylindrical cavity resonator 11 of the third group apparatus 4. In the microwave irradiation space 51 where the standing wave has been formed, the base 6 including the electrode pattern 7 is caused to pass through the above-described magnetic field region 52 where in effect an electric field does not exist and a magnetic field exists, and the electrode pattern 7 is heated for, for example, several seconds. That an electric field does not exist indicates that an electric field is weak and an influence thereof can be effectively ignored. The solder 8 is melted by heating the electrode pattern 7. After the end of heating, the solder 8 is solidified, and the device 9 is soldered and mounted on the electrode pattern 7 via the solder 8.

Figure 9:
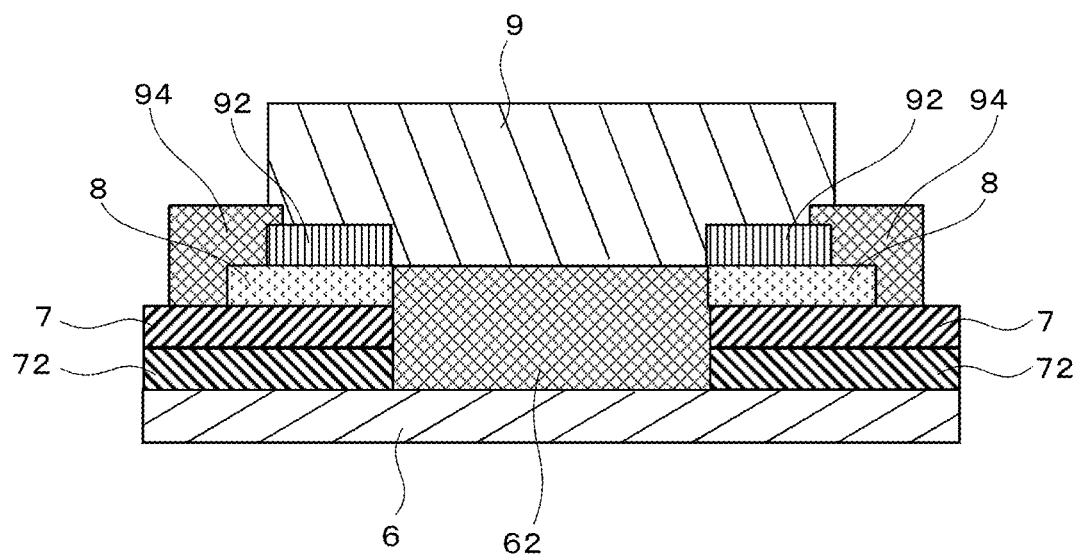
FIG. 9 is a cross-sectional view showing a device structure fabricated by a soldering and mounting method of the present invention.

As a result, as shown in FIG. 9, the electrode pattern 7 is placed on the base 6 via primer 72. Moreover, an electrical connection electrode 92 formed on the device 9 is connected onto the electrode pattern 7 via the solder 8. In addition, the device 9 is bonded via an adhesive layer 62 to the base 6 between the electrode patterns 7. Furthermore, an adhesive 94 is formed around the device 9 to strengthen the boding of the device 9. In this manner, the device 9 is mounted on the base 6.

In the soldering and mounting method of the present invention, a microwave (not illustrated) supplied into the microwave irradiation space 51 forms a single-mode standing wave. A magnetic field and an electric field are then formed. In such a microwave irradiation space 51, the base 6 including the electrode pattern 7 is caused to pass through the magnetic field region 52 where the electric field does not exist and the magnetic field exists. Accordingly, an induced current is generated in the electrode pattern 7 under the influence of the magnetic field, and the electrode pattern 7 is self-heated. On the other hand, the electric field is hardly formed in the magnetic field region 52. Accordingly, the base 6 is hardly influenced by the electric field. Hence, a spark phenomenon (arc discharge) due to the influence of the electric field does not occur on the electrode pattern 7. Such magnetic field heating allows heating the electrode pattern 7 to heat and melt the solder 8. The device 9 is soldered and mounted on the electrode pattern 7. At this point, temperature rise behavior varies depending on the direction of placement of the electrode pattern 7. Variations in temperature rise behavior are described below.

The electrode pattern 7 is an anisotropic pattern with an aspect ratio of 3.7 or greater. The aspect ratio is defined as follows: The electrode pattern 7 includes various shape patterns such as a linear pattern, a rectangular pattern, and a complicated shape pattern. Moreover, there is also a repetitive pattern where a similar shape pattern is repeated.

Firstly, in a case of the rectangular electrode pattern 7 (including a linear pattern of a long, narrow rectangle, the ratio of the longer side by the shorter side (longer side/shorter side) of the rectangle is the aspect ratio of the electrode pattern 7. Also in this case, a rectangular pattern of the same shape as the electrode pattern 7 is set as in the following description.

On the other hand, in terms of the electrode pattern 7 of a rectangle whose corners are cut and the trapezoidal electrode pattern 7, the aspect ratio of a rectangular pattern circumscribing each electrode pattern 7 is set as the aspect ratio of the electrode pattern 7.

Furthermore, in a case of the electrode pattern 7 of a complicated shape, a rectangular pattern circumscribing the electrode pattern 7 is defined. The aspect ratio of the rectangular pattern is set as the aspect ratio of the electrode pattern 7. At this point, it is preferable to determine the size of the rectangular pattern in such a manner as to minimize the value of an area obtained by subtracting the area of the electrode pattern 7 from the area of the rectangular pattern.

Moreover, in a case of the electrode pattern 7 having a space inside, a rectangular pattern circumscribing the electrode pattern 7 and a rectangular pattern circumscribing the space are defined. A larger value between the aspect ratios of the circumscribing rectangular pattern and the rectangular pattern of the space is set as the aspect ratio of the electrode pattern 7.

Alternatively, a thin film pattern 7G is divided into two in the width direction. A rectangular pattern circumscribing each of the two divided thin film patterns is defined. In this case, a rectangular pattern can also be similarly defined for the other of the two divided thin film patterns.

In a case of the electrode pattern 7 including a repetitive pattern, the repetitive pattern is divided into patterns including one vertical pattern and one horizontal pattern adjacent to the vertical pattern, and the divided pattern is set as a measurement pattern. A rectangular pattern is defined for the measurement pattern. If there is no adjacent horizontal pattern, the vertical pattern is set as the measurement pattern. A rectangular pattern is defined for the measurement pattern. The aspect ratio of each rectangular pattern is set as the aspect ratio of each of the divided electrode patterns.

Moreover, the major axis of the electrical connection electrode (not illustrated) of the device 9 to be soldered and mounted is also defined as in the above electrode pattern 7. The major axis of the device 9 is preferably disposed at an angle equal to or greater than 45 degrees and equal to or less than 90 degrees with respect to the oscillation direction of a magnetic field formed by a single-mode standing wave. A heating temperature achieved is increased by disposing the electrical connection electrode of the device 9 in this manner.

In the above heating method, the electrode pattern 7 is heated by one or both of heat generation by magnetic loss caused by the action of the magnetic field of the magnetic field region 52 and heat generation by an induced current generated in the electrode pattern 7 due to the magnetic field of the magnetic field region 52.

The heating time of the electrode pattern 7 in the above heating method is preferably within 300 seconds, more preferably within 30 seconds, still more preferably within 3 seconds, from the viewpoint of preventing thermal damage to the base 6. Since the heating time is short as described above, even if the electrode pattern 7 is heated, thermal damage to the base 6 can be minimized, and the effect that the time required for the soldering and mounting process can be reduced can be obtained.

In a case where the aspect ratio of the above electrode pattern 7 is less than 3.7, the achieved heating temperature decreases by disposing the major axis of the electrode pattern 7 for which the heating temperature is desired to decrease, at an angle of less than 45 degrees with respect to the oscillation direction of the magnetic field. The use of this allows dividing a substrate having a plurality of electrode patterns into a portion desired to be heated and a portion desired not to be heated according to the direction of the major axis of the electrode pattern 7. In other words, the major axis of the electrode pattern 7 is set at less than 45 degrees with respect to the oscillation direction of the magnetic field; accordingly, both of heat generation due to magnetic loss caused by the action of the magnetic field of the magnetic field region 52 and heat generation by an induced current generated in the electrode pattern 7 due to the magnetic field of the magnetic field region 52 hardly occur. In this manner, it is possible to control the heating temperature depending on the cases where the major axis of the electrode pattern 7 is disposed at equal to or greater than 45 degrees and equal to or less than 90 degrees and is disposed at less than 45 degrees, and selectively heat the electrode pattern 7.

In the above soldering and mounting method, an upper and a lower part of the electrode pattern 7 may include a thin film with insulation properties. The upper part of the electrode pattern 7 indicates the top surface of the electrode pattern 7 in plan view, and the lower part indicates the undersurface of the electrode pattern 7. Moreover, the thin film with insulation properties (not illustrated) is preferably formed in a region excluding a region where the solder 8 is disposed. The electrode pattern may be a single pattern or a collective pattern configured including a collection of some electrode patterns. The above term "insulation properties" indicates high electrical resistance, not heated in a magnetic field, and a low thermal conductivity.

The insulating thin film is preferably a thin film of any of resin, ceramics, glass, oxide, paper, fabric, or the like, more preferably any of resin or an oxide. The thickness of the insulating thin film is preferably 1 nm to 1 mm, and further preferably 20 nm to 500 μm.

A standing wave formed in the microwave irradiation space is preferably in $TM_{n10}$ (n is an integer of 1 or more) mode or $TE_{10n}$ (n is an integer of 1 or more) mode. It is preferable to supply, to the cavity resonator 11, microwave energy at a resonance frequency that agrees with the standing wave, and automatically adjust the frequency of a microwave supplied to the cavity resonator 1 in such a manner as to always form a standing wave in a target mode in response to a change in resonance frequency. Specifically, as described above, a method that finely adjusts the microwave frequency in the microwave generator 21 can be cited. Alternatively, as described above, making fine adjustments by inserting/removing a dielectric or conductor into/from the cavity resonator 11 can be cited.

Next, the fourth group apparatus 5 removes flux after melting the solder, and then performs an adhesive application step. Furthermore, the adhesive is dried and cured. Moreover, it is also preferable to, for example, perform a process of degrading an organic substance using high energy vacuum ultraviolet light of an excimer lamp (for example, the wavelength of light emitted is 172 nm (an Xe excimer lamp)).

A thin film pattern firing method is described below as a preferred embodiment of the microwave heating method of the present invention. A preferred embodiment of a microwave firing apparatus suitable to perform the thin film pattern firing method is described with reference to the drawings.

Figure 10:
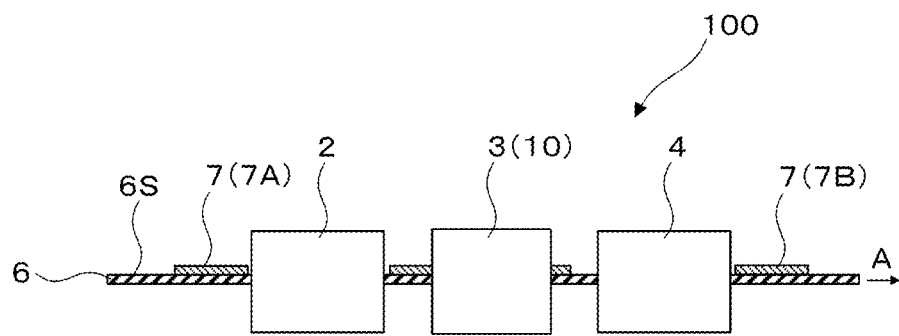
FIG. 10 is a block diagram schematically showing an example of a preferred entire configuration of a thin film pattern firing apparatus of the present invention.

As shown in FIG. 10, a thin film pattern firing apparatus 100 includes an upstream apparatus (also referred to as the first group apparatus 2) for preheating, and a microwave firing apparatus (also referred to as the second group apparatus 3) having a cavity resonator(s). It is preferable to use the above-mentioned microwave heating apparatus 10 as the microwave firing apparatus. Furthermore, a downstream apparatus (also referred to as the third group apparatus 4) that performs postprocessing after firing is provided. These apparatuses are disposed in the order of the first group apparatus 2, the second group apparatus 3, and the third group apparatus 4.

The first group apparatus 2 is a heating apparatus that preliminarily dries the thin film pattern 7 before heating and firing the thin film pattern 7 with microwaves. Examples of the heating apparatus include an infrared heating apparatus, a hot air heating apparatus, a hot plate, and an electric furnace. However, the heating apparatus is not limited to them.

The second group apparatus 3 is the microwave heating apparatus 10 including one or more cavity resonators. The illustrated example shows an example using one cavity resonator. However, two or more (a plurality of) cavity resonators may be placed.

The third group apparatus 4 performs heat treatment for further firing (sintering) the conductive thin film pattern 7 fired by the second group apparatus 3. The above term "further firing" is to heat and sufficiently sinter all thin film patterns including a thin film pattern that has not been sufficiently fired by the second group apparatus 3. For example, in the firing by the second group apparatus 3 (the microwave heating apparatus 10), all thin film patterns 7 including a pattern of an aspect ratio that has not been sintered in a magnetic field formed in the cavity resonator 11 are heated and sintered. Moreover, the third group apparatus 4 is used for a process of degrading and removing, for example, a residual organic substance that cannot be sufficiently removed by microwaves, and a process of obtaining an annealing effect that aims to reduce surface resistance of a conductive thin film pattern. The heating means can be any of an excimer lamp, an ultraviolet lamp, atmospheric-pressure plasma irradiation means, and a xenon flash lamp, but is not limited to them.

The base 6 including the thin film pattern 7 is transferred by the transfer mechanism (not illustrated) to the first group apparatus 2, the second group apparatus 3, and the third group apparatus 4 in order, and undergoes a process of each apparatus continuously. However, constraints are not imposed on the placement of the apparatuses and the order of the processes. The processes can be performed in any order.

Next, a preferred embodiment of the thin film pattern firing method is described as the microwave heating method of the present invention with reference to FIG. 10 and FIG. 4 described above. However, the electrode pattern 7, the solder 8, and the device 9 in FIG. 4 are described assuming to be substituted by the thin film pattern 7.

It is preferable to perform the thin film pattern firing method of the present invention using the above thin film pattern firing apparatus 100.

Firstly, as shown in FIG. 10, the thin film pattern 7 printed (for example, screen printed) on the base (for example, sheet or substrate) 6 is preliminarily dried by the first group apparatus 2 being the apparatus upstream of the microwave heating apparatus 10. For example, a hot plate is used as the first group apparatus 2. The printed thin film pattern 7 is, for example, dried at 30° C. to 120° C. for 1 second to 10 minutes, using the hot plate. The preliminary drying is not particularly restricted as long as the temperature is equal to or less than the firing temperature of the pattern 7 and the heat resistant temperature of the substrate. It is preferable to perform the preliminary drying until a solvent component included in the thin film pattern 7 dries. In the above preliminary drying, the hot plate is used. However, it is also possible to use the above-mentioned other heating apparatus that performs preliminary drying.

Next, a single-mode standing wave where a magnetic field and an electric field are separated is formed in the microwave irradiation space 51 of the cylindrical cavity resonator 11 of the second group apparatus 3. In the microwave irradiation space 51 where the standing wave has been formed, the base 6 including the thin film pattern 7 is caused to pass through the above-described magnetic field region 52 where in effect the electric field does not exist and the magnetic field exists, and the thin film pattern 7 is fired. The thin film pattern 7 is formed on one or each of the top surface and the undersurface of the base 6, and is printed by, for example, screen printing. Therefore, the thin film pattern 7 printed on a base surface 6S is in a wet state including a solvent. The thin film pattern 7 (7A) in the wet state is fired to obtain the sintered dry conductive thin film pattern 7 (7B).

The pattern 7A before firing includes metal particles, a resin component, and the solvent, and a large amount of the resin component remains in the pattern 7A before firing. Firing allows compacting the metal particles themselves by heat and also improving contact between the metal particles by burning off the resin component, and therefore improving conductivity.

The above term "firing" is the "process of forming, heating, shrinking, and densifying raw material powder of the thin film pattern, and obtaining a sintered compact having a fixed shape and strength." In other words, it indicates burning a raw material of the thin film pattern at a high temperature and causing a change in properties. The term "sintering" is a "phenomenon where raw material powder of the thin film pattern is compacted by heat at a high temperature." Specifically, a gap can be observed between particles of the raw material powder of the thin film pattern at the beginning of the sintering process. However, when sintering occurs under a high-temperature environment (a temperature lower than the melting point), the contact area between particles increases to reduce the gap. The particles are compacted by heat to ensure a fixed stable shape and strength.

In the thin film pattern firing method of the present invention, a microwave (not illustrated) supplied into the microwave irradiation space 51 forms a single-mode standing wave. A magnetic field and an electric field are then formed. In such a microwave irradiation space 51, the base 6 including the thin film pattern 7 is caused to pass through the magnetic field region 52 where the electric field does not effectively exist and the magnetic field exists. Accordingly, an induced current is generated in the thin film pattern 7 under the influence of the magnetic field. The thin film pattern 7 is self-heated. On the other hand, the electric field is not effectively formed in the magnetic field region 52 so that the base 6 is not influenced by the electric field. Hence, a spark phenomenon (arc discharge) due to the influence of the electric field does not occur on the thin film pattern 7. Such magnetic field heating allows heating and firing the thin film pattern 7. At this point, the temperature rise behavior varies depending on the shape and placement direction of the thin film pattern 7. Variations in temperature rise behavior are described below.

The thin film pattern 7 is an anisotropic thin film pattern with an aspect ratio of 3.7 or greater. A method for defining the aspect ratio of the thin film pattern 7 is described below. As shown in FIGS. 11(A) to 11(F) and 12(G) and 12(H), there are various shape patterns such as a linear pattern, a rectangular pattern, and a complicated shape pattern for the thin film pattern 7 to be fired. Moreover, there is also a repetitive pattern where a similar shape pattern is repeated. In the drawings, rectangular patterns indicated by chain double-dashed lines are drawn in a state of being slightly away from the thin film pattern to make it easy to see. In reality, a part or the entire outline of the rectangular pattern (in a case where the outline of the thin film pattern is a rectangle) agrees with the outline of the thin film pattern.

The aspect ratio of the thin film pattern 7 is defined as follows:

In a case of the rectangular thin film pattern 7A (including a linear pattern of a long, narrow rectangle (not illustrated)) shown in FIG. 11A, the ratio of the longer side by the shorter side (longer side/shorter side) of the rectangle is the aspect ratio of the thin film pattern 7A. Also in this case, a rectangular pattern (8A) of the same shape as the thin film pattern 7A is set as in the following description.

On the other hand, in terms of the thin film pattern 7B of a rectangle whose corners are cut, which is shown in FIG. 11(B), and a trapezoidal thin film pattern 7C shown in FIG. 11(C), the aspect ratios of rectangular patterns 8B and 8C circumscribing the thin film patterns 7B and 7C are set as the aspect ratios of the thin film patterns 7B and 7C.

Furthermore, in a case of complicated shape thin film patterns 7D to 7F shown in FIGS. 11(D) to 11(F), rectangular patterns 8D to 8F circumscribing the thin film patterns 7D to 7F respectively are defined. The aspect ratios of the rectangular patterns 8D to 8F are set as the aspect ratios of the thin film patterns 7D to 7F. At this point, it is preferable to determine the sizes of the rectangular patterns 8D to 8F in such a manner as to minimize the values of areas obtained by subtracting the areas of the thin film patterns 7D to 7F from the areas of the rectangular patterns 8D to 8F.

Figure 12G:
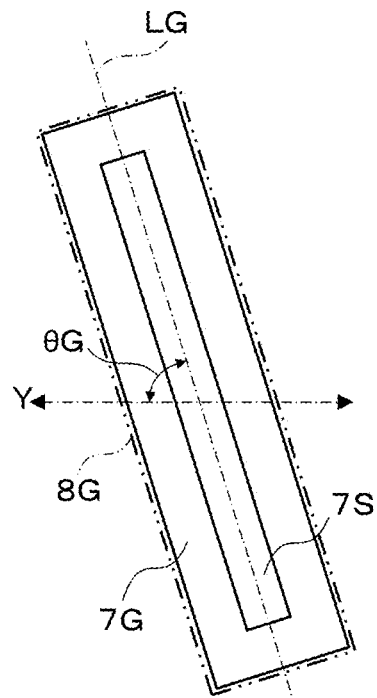
FIGS. 12(G) to 12(H) each are a plan view showing an example of a thin film pattern and a rectangular pattern.

In a case of the thin film pattern 7G shown in FIG. 12(G), the thin film pattern 7G having a space 7S inside, the aspect ratio is determined on the basis of both of a rectangular pattern circumscribing the thin film pattern 7G and a rectangular pattern circumscribing the space 7S. For example, a larger value between the aspect ratios of the circumscribing rectangular pattern and the rectangular pattern of the space is set as the aspect ratio of the electrode pattern 7.

Alternatively, the thin film pattern 7G is divided into two in the width direction. A rectangular pattern circumscribing each of the two divided thin film patterns is defined. In this case, a rectangular pattern can also be similarly defined for the other of the two divided thin film patterns.

Figure 12H:
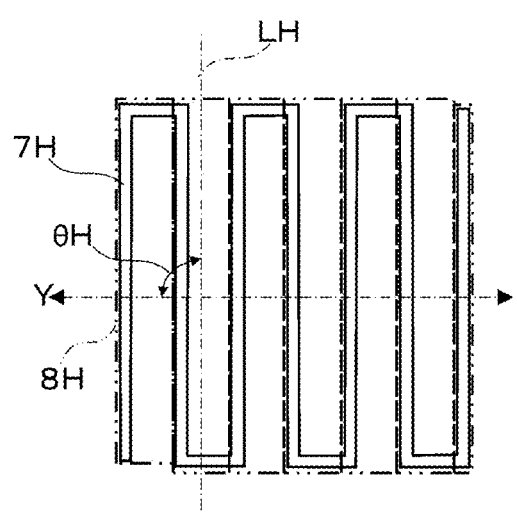

In a case of a thin film pattern 7H shown in FIG. 12(H), the thin film pattern 7H including a repetitive pattern, the repetitive pattern is divided into patterns including one vertical pattern and one horizontal pattern adjacent to the vertical pattern, and the divided pattern is set as a measurement pattern. A rectangular pattern 8H is defined as the measurement pattern. This case is similar to the above-mentioned case of FIG. 12(D). Therefore, the vertical pattern indicates a longitudinal pattern, and the horizontal pattern indicates a lateral pattern.

At least a part of (that is, a part of or the entire) major axis L of the thin film pattern 7 is disposed at an angle equal to or greater than 45 degrees and equal to or less than 90 degrees with respect to an oscillation direction (a direction perpendicular to the central axis C: Y direction) of a magnetic field H generated in the magnetic field region. The "major axis L" indicates an axis that extends in the longitudinal direction of the thin film pattern and passes the center in the width direction. If, for example, linear patterns are disposed in orthogonal directions as in a polygonal line pattern, it is possible to dispose the major axis of each linear pattern forming the polygonal line pattern at 45 degrees with respect to the oscillation direction of the magnetic field. Such disposition allows disposing the major axis of any linear pattern forming the polygonal line pattern at 45 degrees with respect to the oscillation direction of the magnetic field.

On the other hand, if the shape of the thin film pattern 7 is the pattern shapes shown as examples in FIGS. 11(A) to 11(F) and 12(G) and 12(H), the longitudinal directions passing the centers of the rectangular patterns 8A to 8H in the width direction are set as major axes LA to LH. Moreover, it is preferable to set angles θA to θH formed between the major axes LA to LH and the oscillation direction Y of the magnetic field H at equal to or greater than 45 degrees and equal to or less than 90 degrees as described above.

It is preferable that the length of the thin film pattern in the major axis direction is a length of 1/10 or greater of the wavelength of a microwave supplied into the microwave irradiation region.

In the above firing method, the thin film pattern 7 is fired by one or both of heat generation by magnetic loss caused by the action of the magnetic field of the magnetic field region 52 and heat generation by an induced current generated in the thin film pattern 7 due to the magnetic field of the magnetic field region 52.

In the above thin film pattern firing method, the upper and lower parts of the thin film pattern may include a thin film with insulation properties. The thin film pattern may be a single pattern or a collective pattern configured including a collection of some thin film patterns. The above term "insulation properties" indicates high electrical resistance, not heated in a magnetic field, and a low thermal conductivity.

The thin film with insulation properties is preferably a thin film of, for example, resin, ceramics, glass, or an oxide, more preferably resin or an oxide. The thinness of the thin film with insulation properties is preferably 1 nm to 1 cm, more preferably 20 nm to 500 µm.

A standing wave formed in the microwave irradiation space is preferably in $TM_{n10}$ (n is an integer of 1 or more) mode or $TE_{10n}$ (n is an integer of 1 or more) mode. It is preferable to supply, to the cavity resonator 11, microwave energy at a resonance frequency that agrees with the standing wave, and automatically adjust the frequency of a microwave supplied to the cavity resonator 11 in such a manner as to always form a standing wave in a target mode in response to a change in resonance frequency. Specifically, as described above, a method that finely adjusts the microwave frequency in the microwave generator 21 can be cited.

The third group apparatus 4 performs heat treatment for further sintering the thin film pattern 7 fired by the second group apparatus 3 on the thin film pattern 7 heated and fired in the above cavity resonator 11. In the third group apparatus 4, it is preferable to perform the process of degrading an organic substance using, for example, an excimer lamp, for example, high energy vacuum ultraviolet light of 172 nm (an Xe excimer lamp).

EXAMPLES

The microwave heating apparatus 10 of the present invention will be described in more detail based on examples given below, but the invention is not meant to be limited by these.

Examples 1 to 3

Each of Examples 1 to 3 used, as a measurement sample, a commercially available resin sheet material with a width of 8 cm and with a different surface resistivity, the sheet material being shown in Table 1. Example 1 used a transparent conductive sheet (Staclear-NCF) whose base is polyethylene terephthalate (PET). Example 2 used a conductive bag (carbon black added) whose base is polyolefin. Example 3 used an antistatic aluminum-metallized bag whose base is PET. Each sheet material was fixed in a 10 cm-wide magnetic field region in the cylindrical cavity resonator 11, and magnetic field heating and dielectric heating were performed on each sheet, using the microwave heating apparatus 10 shown in FIG. 1. In magnetic field heating, a cavity resonator for the $TM_{110}$ mode was used, and standing waves in $TM_{110}$ mode were formed. In magnetic field heating, standing waves in $TM_{110}$ mode were formed. In dielectric heating, standing waves in $TM_{010}$ mode were formed, and each measurement sample was fixed along the central axis. Both of magnetic field heating and dielectric heating were performed within a microwave frequency range of 2.3 to 2.7 GHz and a microwave output range of 0 to 100 W. The same applies to Examples 4 to 7 and Comparative Examples.

Comparative Example 1

On the other hand, as Comparative Example 1, a conductive file was used, whose sheet material was made of polypropylene (PP). The thickness and surface resistivity of each sheet are as shown in Table 1.

The heating results of Examples 1 to 3 and Comparative Example 1 are shown in Table 1.

TABLE 1

| | Name of commercially available sheet | Thickness of sheet (µm) | Surface resistivity | Base | Availability of dielectric heating | Availability of magnetic field heating |
|---|---|---|---|---|---|---|
| Example 1 | Transparent conductive sheet (STACLEAR NCF) | 100 | $200 \Omega/\square$ | PET | N | Y |
| Example 2 | Conductive bag (carbon black added) | 50 | $10^6 \Omega/\square$ | Polyolefin | N | Y |
| Example 3 | Antistatic Al-metallized bag | 75 | $10^8 \Omega/\square$ | PET | N | Y |
| Comparative Example 1 | Conductive file | 200 | $10^9 \Omega/\square$ | PP | Y | N |

In Table 1, a Y sign indicates a case where dielectric heating was available, and an N sign indicates a case where dielectric heating was not available. Moreover, the Y sign indicates a case where magnetic field heating was available, and the N sign indicates a case where magnetic field heating was not available. For a cavity resonator used in dielectric heating and a cavity resonator used in magnetic field heating, different cavity resonators were used. The cylindrical portion of each cylindrical resonator has a different inner diameter.

The base of the resin sheet material with a low surface resistivity (equal to or less than $10^8 \Omega/\square$) of Examples 1 to 3 could not be heated in dielectric heating generally used. On the other hand, it was found that magnetic field heating could heat the base. The availability of dielectric heating and magnetic field heating was judged by checking whether or not a resonance frequency of the $TM_{010}$ mode (availability of dielectric heating) or the $TM_{110}$ mode (availability of magnetic field heating) could be detected by the method described in the above-mentioned paragraph [0034].

Example 4

Next, Example 4 used, as a measurement sample, the base of the 8 cm-wide sheet material of the antistatic Al-metallized bag used in Example 3 above.

Figure 13:
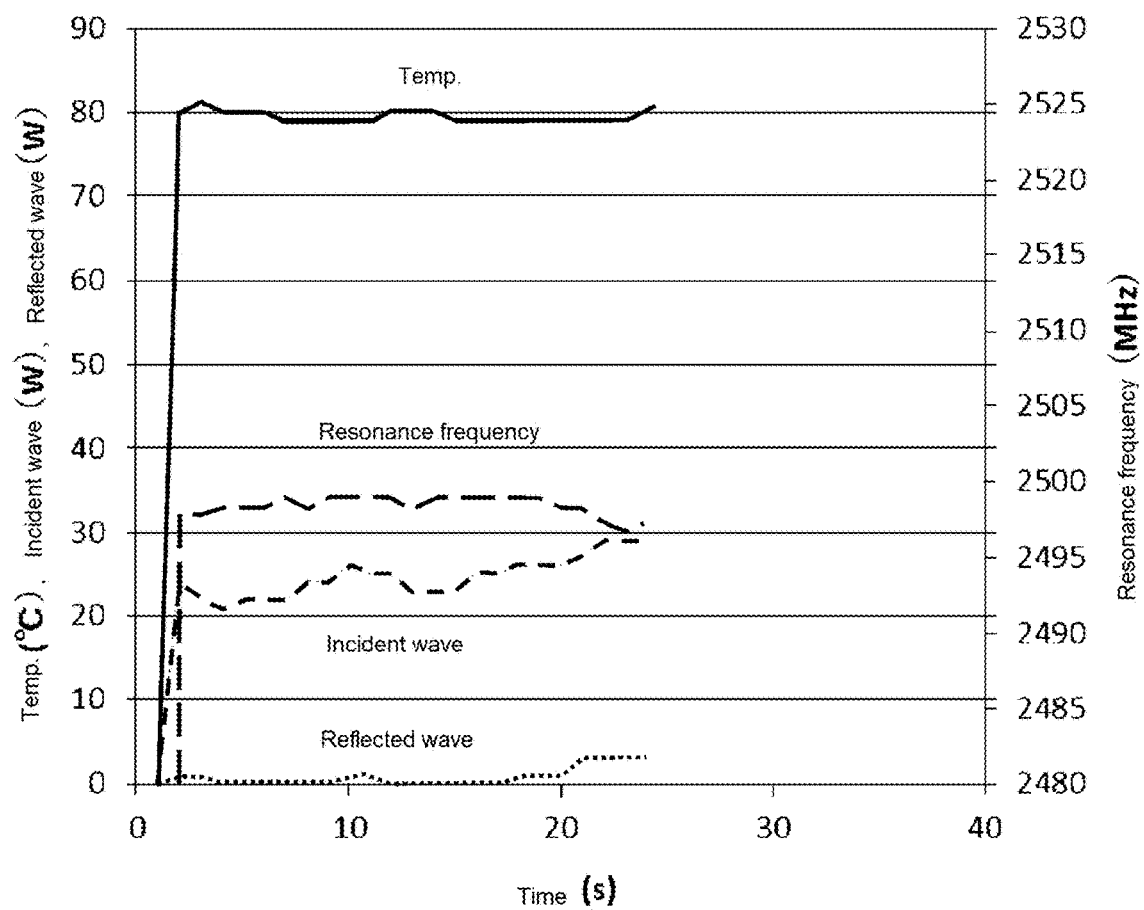
FIG. 13 is a diagram showing: changes in the temperature of a sheet material of an antistatic aluminum-metallized bag to be used in Example 3, at the time when the sheet material was heated while being moved in a magnetic field irradiation (reaction) space; and changes in the incident wave, reflected wave, and resonance frequency, each was of a microwave heating apparatus 1.
Figure 14:
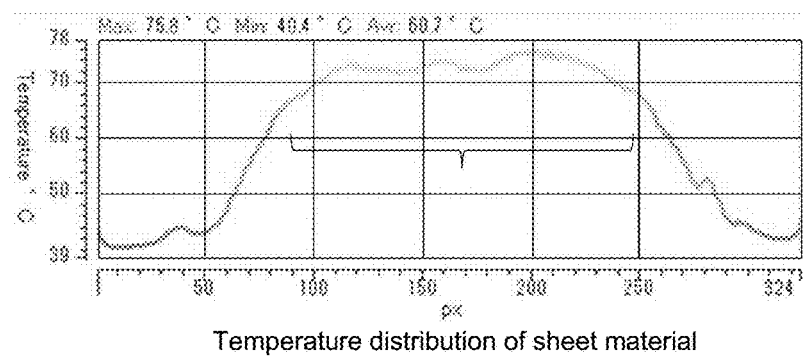
FIG. 14 is a temperature distribution map in a transverse (width) direction of the sheet material of the antistatic aluminum-metallized bag to be used in Example 3, the temperatures being measured using a thermal image measurement apparatus at the time when the sheet material was heated while being moved in the magnetic field irradiation (reaction) space. In the map, a region indicated by a curly bracket indicates the transverse (width) of the sheet material.

An electromagnetic wave sensor measured changes in the temperature of the sheet material, and changes in the incident wave, reflected wave, and resonance frequency of the microwave heating apparatus 10 upon heating while moving the measurement sample at a speed of 0.2 cm/s in the 10 cm-wide magnetic field irradiation (reaction) space. As the electromagnetic wave sensor, one that can measure changes as direct current signals by a rectifier circuit including a diode using a loop antenna was used. In terms of the temperature measurement, the temperature at the central portion of the sheet was measured using a radiation thermometer, TMHX-CN0500, made by Japan Sensor Corporation. In terms of magnetic field heating for this, a cavity resonator for the $TM_{110}$ mode was used, standing waves in $TM_{110}$ mode were formed, and the measurement sample was fixed along the central axis. The results are shown in FIG. 13. The temperature stayed stably at 80±1° C. with reference to 80° C. being a set temperature. Moreover, as a result of measuring the temperature distribution in the width direction of the sheet material using the thermal image measurement apparatus 41, it was confirmed that the entire sheet was heated uniformly (refer to FIG. 14).

Examples 5 to 6

Example 5 used, as a measurement sample, a commercially available conductive glass of a sheet shape with a width of 8 cm, the conductive glass being shown in Table 2. Example 6 used, as a measurement sample, a commercially available conductive silicone rubber (mixed with carbon) of a sheet shape with a width of 8 cm, the conductive silicone rubber being shown in Table 2. These measurement samples were fixed in a cavity resonator with a width of 10 cm, and heated by magnetic field heating and dielectric heating, using the microwave heating apparatus 10 shown in FIG. 1. On the other hand, Comparative Examples 5 and 6 used samples similar to Examples 5 and 6, except a change in the heating method from magnetic field heating to dielectric heating in Examples 5 and 6. In magnetic field heating, a cavity resonator for the $TM_{110}$ mode was used, and standing waves in $TM_{110}$ mode were formed. In dielectric heating, a cavity resonator for the $TM_{010}$ mode was used, standing waves in $TM_{010}$ mode were formed, and each measurement sample was fixed along the central axis.

The heating results are shown in Table 2.

TABLE 2

| | Name of commercially available sheet | Thickness of sheet (μm) | Surface resistivity | Availability of magnetic field heating | Availability of dielectric heating |
|---|---|---|---|---|---|
| Example 5 | Conductive glass | 2,200 | 7Ω/□ | Y | — |
| Example 6 | Conductive silicone rubber (carbon mixed) | 1,000 | 50Ω/□ | Y | — |
| Comparative Example 5 | Conductive glass | 2,200 | 7Ω/□ | — | N |
| Comparative Example 6 | Conductive silicone rubber (carbon mixed) | 1,000 | 50Ω/□ | — | N |

In Table 2, a Y sign indicates a case where dielectric heating was available, and an N sign indicates a case where dielectric heating was not available. Moreover, the Y sign indicates a case where magnetic field heating was available, and the N sign indicates a case where magnetic field heating was not available.

Figure 15:
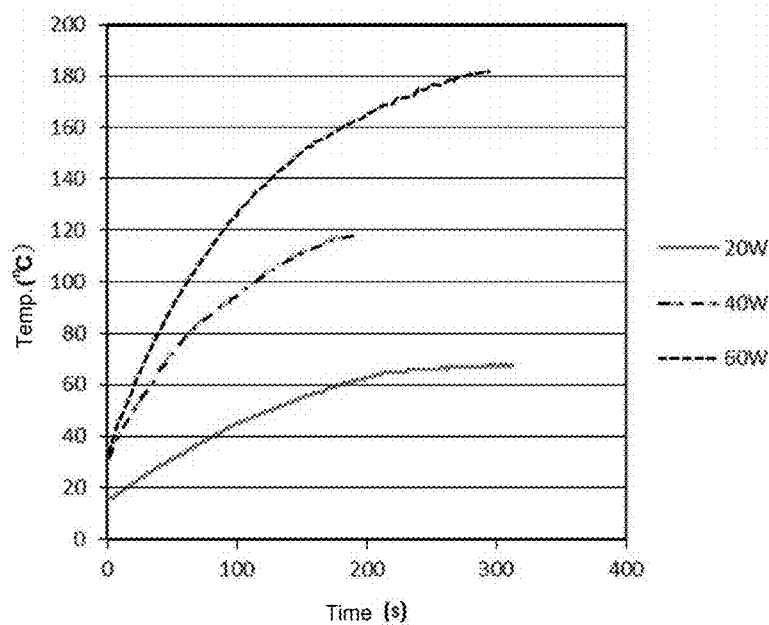
FIG. 15 is a diagram showing results of measuring the temperature at a sheet central portion using a radiation thermometer, the results being obtained by heating conductive glass, changing a microwave output.
Figure 16:
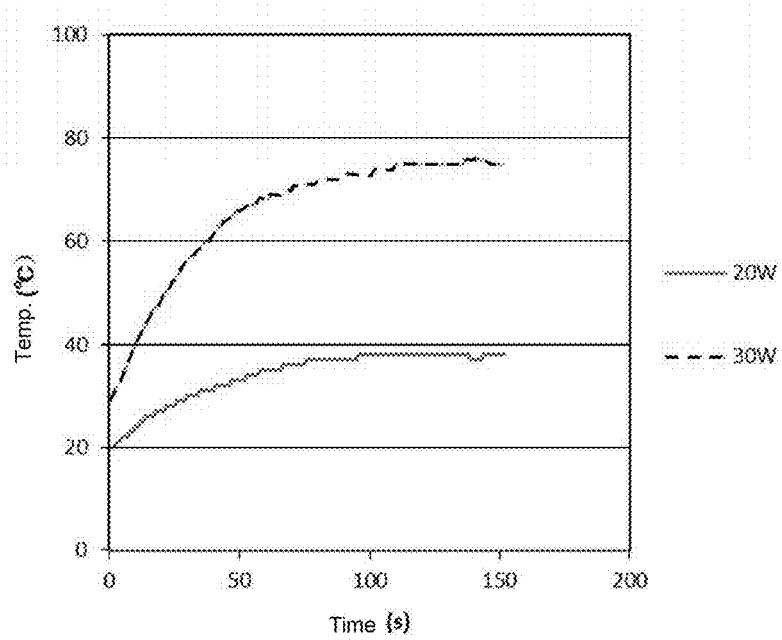
FIG. 16 is a diagram showing results obtained by heating conductive silicone rubber, changing the microwave output, and measuring the temperature at the sheet central portion using the radiation thermometer.

As a result, it was found that heating was not possible in dielectric heating generally used. On the other hand, it was found that heating was possible in magnetic field heating. The availability of dielectric heating and magnetic field heating was checked on the basis of whether or not a standing wave of a microwave was formed in the microwave heating apparatus, as in the heating of the resin sheet material. Furthermore, results of heating the conductive glass and the conductive silicone rubber changing the microwave output are shown in FIGS. 15 and 16, respectively. As a result of measuring the temperature at the central portion of the sheet using a radiation thermometer, it was confirmed that as the microwave output increases, the achieved temperature also increases.

Example 7

A conductive paste was heated.

Figure 17:
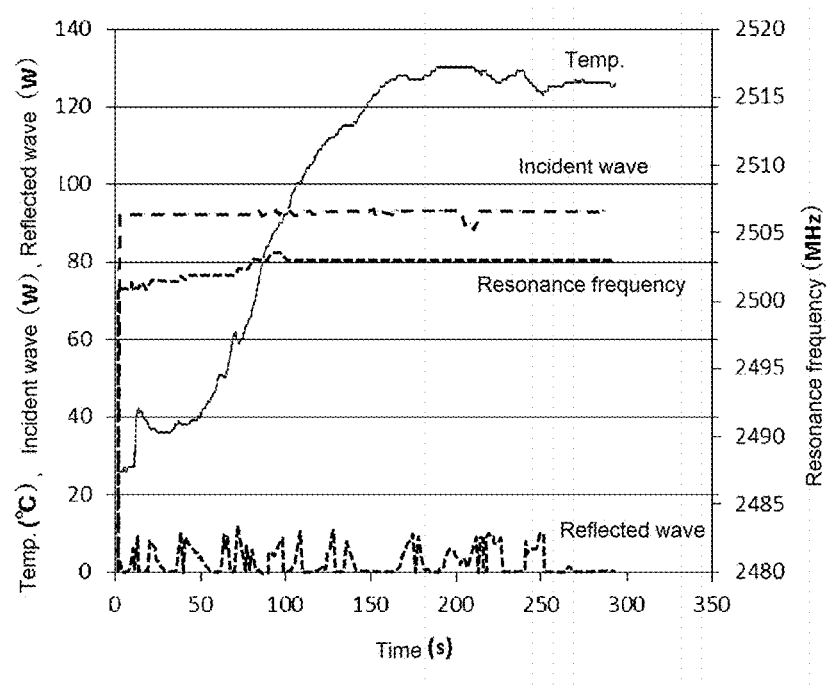
FIG. 17 is a diagram showing: changes in the temperature of a sheet material, at the time when heated where a conductive paste coat to be used in Example 7 was placed at a central portion in the magnetic field irradiation (reaction) space; and changes in the incident wave, reflected wave, and resonance frequency, each was of the microwave heating apparatus 1.
Figure 18:
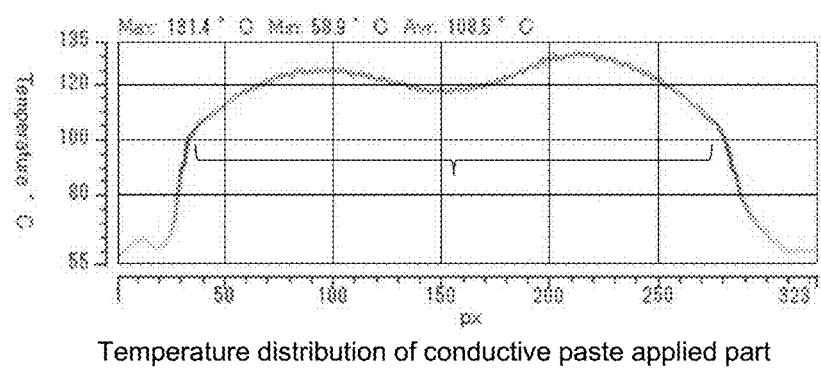
FIG. 18 is a temperature distribution map in a transverse (width) direction of the sheet material of the conductive paste to be used in Example 7, the temperatures being measured using a thermal image measurement apparatus at the time when the sheet material was placed at the central portion and heated in the magnetic field irradiation (reaction) space. In the map, a region indicated by a curly bracket indicates the transverse (width) of the sheet material.
Figure 19:
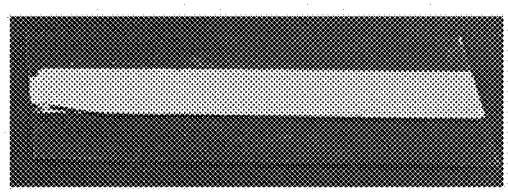
FIGS. 19(A) and 19(B) each are a photographic substitute for a drawing, each of which shows the external appearance of the sheet material of the conductive paste to be used in Example 7.
Figure 19:
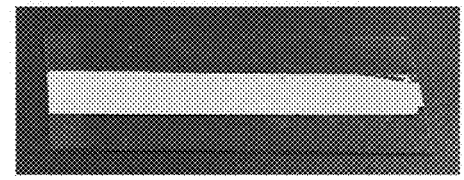

In Example 7, a silver conductive paste (trade name REXALPHA made by Toyochem Co., Ltd.) was applied with a thickness of 0.05 mm to 75 mm×10 mm on fused quartz, and a measurement sample was prepared. 10 minutes after the application, magnetic field heating was performed using the microwave heating apparatus 10 shown in FIG. 1. A standing wave in $TM_{110}$ mode was formed in magnetic field heating. The measurement sample was placed at a central portion (including the central axis C) in the magnetic field region of the microwave heating apparatus 10, and heated at an achieved temperature of 130° C. for five minutes by magnetic field heating. FIG. 17 shows changes in the temperature of a paste application part and changes in the incident wave, reflected wave, and resonance frequency of the microwave heating apparatus during heating. An electromagnetic wave sensor was used for the measurements. A loop antenna was used as the electromagnetic wave sensor. The temperature increased continuously. A sudden increase in temperature due to a spark of the conductive paste, which was a concern in dielectric heating, did not occur in magnetic field heating. As a result of measuring the temperature distribution of the entire paste application part during heating using the thermal image measurement apparatus 41, uniform heating was confirmed (FIG. 18). Moreover, in the appearance of each test specimen before (refer to FIG. 19(A)) and after (refer to FIG. 19(B)) magnetic field heating shown in FIGS. 19(A) and 19(B), an abnormally heated part due to a spark was not observed.

Comparative Example 7

In Comparative Example 7, measurement samples similar to Example 7 were prepared. Table 3 shows results obtained by heating the measurement samples at 130° C. for 5 minutes and for 30 minutes in an electric furnace and measuring electric resistivity at five points on the paste application surface.

TABLE 3

| | Heating conditions | | |
|---|---|---|---|
| | Magnetic field heating 130° C., 5 minutes | Electric furnace 130° C., 5 minutes | Electric furnace 130° C., 30 minutes |
| Electric resistivity of 5 coating parts | $4.9 \times 10^{-5}$ Ω·cm | $4.1 \times 10^{-4}$ Ω·cm | $4.7 \times 10^{-4}$ Ω·cm |
| | $4.8 \times 10^{-5}$ Ω·cm | $4.6 \times 10^{-4}$ Ω·cm | $3.4 \times 10^{-4}$ Ω·cm |
| | $5.1 \times 10^{-5}$ Ω·cm | $4.8 \times 10^{-4}$ Ω·cm | $4.6 \times 10^{-4}$ Ω·cm |
| | $5.4 \times 10^{-5}$ Ω·cm | $3.7 \times 10^{-4}$ Ω·cm | $5.3 \times 10^{-4}$ Ω·cm |
| | $4.7 \times 10^{-5}$ Ω·cm | $4.1 \times 10^{-4}$ Ω·cm | $4.2 \times 10^{-4}$ Ω·cm |
| Average value | $5.0 \times 10^{-5}$ Ω·cm | $4.3 \times 10^{-4}$ Ω·cm | $4.4 \times 10^{-4}$ Ω·cm |

The electric resistivities of the measurement samples that underwent magnetic field heating with microwaves show substantially the same value at all the five points. It can be said that the entire application surface was heated uniformly. It was found that the test specimen for magnetic field heating can be reduced in electric resistivity (increased in conductivity), and is also superior in heating efficiency, compared to the results of the electric furnace heating.

Comparative Example 8

Figure 20:
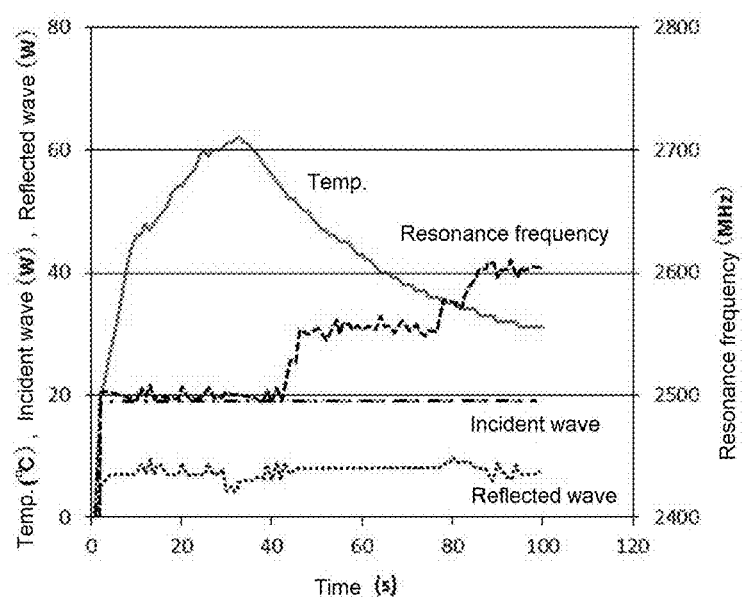
FIG. 20 is a diagram showing: changes in the temperature of a sheet material of conductive paste to be used in Comparative Example 8, at the time when the sheet material was placed at the central portion of the cavity resonator, a standing wave in $TM_{010}$ mode was formed, and dielectric heating was performed; and changes in the incident wave, reflected wave, and resonance frequency, each was of the microwave heating apparatus.

Moreover, in Comparative Example 8, the silver conductive paste (trade name REXALPHA made by Toyochem Co., Ltd.) was applied with a thickness of 0.05 mm to 15 mm×4 mm on fused quartz, and a measurement sample was prepared. 10 minutes after the application, the measurement sample was placed at the central portion (including the central axis C) in the cavity resonator, standing waves in $TM_{010}$ mode were formed, and dielectric heating was performed. FIG. 20 shows changes in the temperature of a paste application part and changes in the incident wave, reflected wave, and resonance frequency of the microwave heating apparatus during heating. The temperature increased up to approximately 60° C., and then decreased gradually. The resonance frequency increased with decreasing temperature. It was confirmed that the electric resistivity of the test specimen after dielectric heating for 100 seconds was finished was 0.13 Ω·cm and conductivity was inferior as compared to magnetic field heating. It is considered that in dielectric heating for a conductive paste, microwave absorption is reduced with increasing conductivity and heating is difficult.

The soldering and mounting method as an example of the microwave heating method of the present invention is described below in more detail on the basis of Examples. However, the present invention should not be construed as being limited to them.

Example 11

In Example 1, the silver conductive paste (trade name REXALPHA, Toyochem Co., Ltd.) was screen-printed on a polyethylene terephthalate base (PET substrate) being a plate-shaped low-heat resistant substrate, and an electrode pattern was formed. The electrode pattern was dried by a hot plate at 60° C. for 20 minutes, and a solvent was removed. A thermosetting solder resist (trade name S-222 X16K, Taiyo Holdings Co., Ltd.) was screen-printed to mask the electrode pattern. The thermosetting solder resist was dried by the hot plate at 80° C. for 60 minutes. Next, a solder paste (trade name Eco Solder Paste LT142, Senju Metal Industry Co., Ltd.) was stencil-printed, and solder was formed on the electrode pattern. A temperature and humidity sensor chip (trade name SHT-31, Sensirion Japan Co. Ltd.) was mounted as a device on the solder. The PET substrate where the temperature and humidity sensor was mounted was gently placed along the central axis C of the cylindrical cavity resonator. Standing waves in $TM_{110}$ mode were formed in the cavity resonator. Microwaves were applied at 100 W for three seconds. It was confirmed by a thermal image measurement apparatus that the temperature of the electrode pattern increased to or above 150° C.

Figure 21:
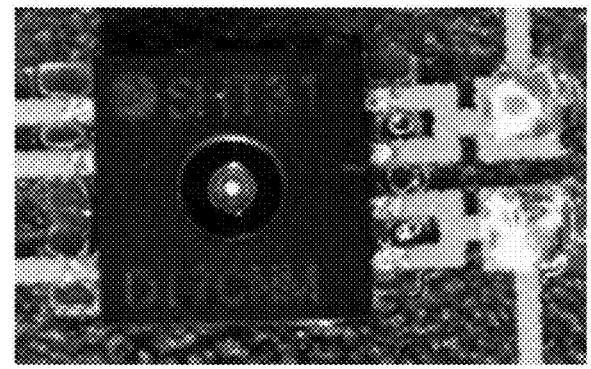
FIG. 21 is a photographic substitute for a drawing, which shows a temperature and humidity sensor soldered and mounted on an electrode pattern by the soldering and mounting method of the present invention.

The PET substrate was removed from the cavity resonator, and the appearance of the PET substrate was observed. As a result, as shown in FIG. 21, it was confirmed that the solder (solder paste pattern) melted and the PET substrate did not deform. In this manner, nine temperature and humidity sensors of measurement samples of Example 1 were prepared.

Moreover, in Example 1, the temperature and humidity were measured under an environment in the same room to check the operation of the above nine temperature and humidity sensors of the measurement samples.

For example, in terms of the measurement of the mounted sample, power was supplied to a temperature and humidity analog output module SHTDA-2 made by SysCom Corporation, using a DC signal source SS7012 made by Hioki E.E. Corporation. The mounted sample was connected to SHTDA-2, and the temperature and humidity were calculated from the output voltage of SHTDA-2. SHTDA-2 is inherently equipped with SHT-35 (an upper model of SHT-31) made by Sensirion Japan Co. Ltd. Data measured using SHT-35 was used for reference.

Comparative Examples 11 to 12

On the other hand, in Comparative Example 1, a reading apparatus was used as it is as a temperature and humidity sensor for reference, and measurement data of SHT-35 was used for reference. In Comparative Example 2, a commercially available digital thermo-hygrometer (tradename HM41, Vaisala KK) was used to measure the temperature and humidity in the same environment as Example 1.

Figure 22:
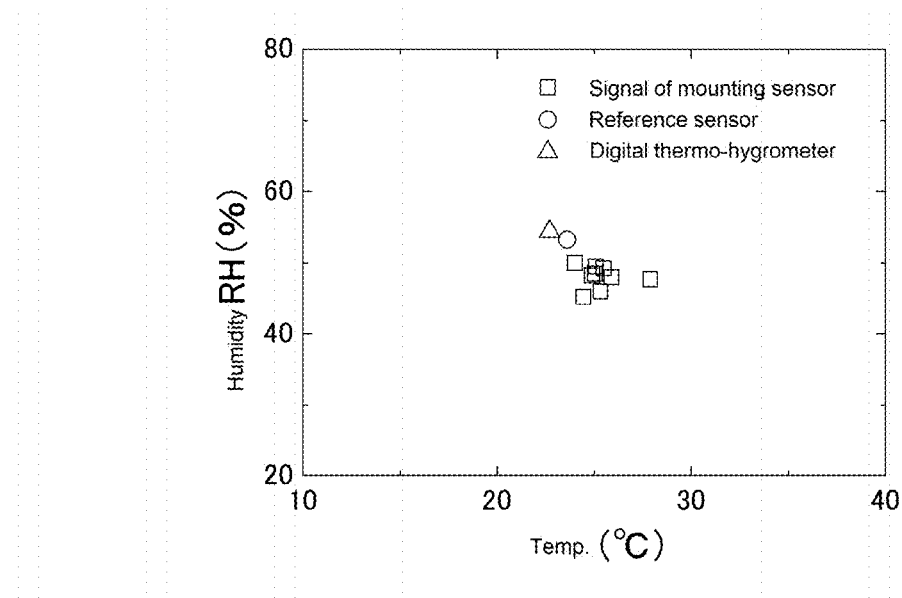
FIG. 22 is a graph showing results of measuring the temperature and humidity under an environment in the same room.

As shown in FIG. 22, as a result of the measurements, in the measurements of the temperature and humidity under the environment in the same room, the nine temperature and humidity sensors of Example 1 read substantially the same values as the measurement results of the temperature and humidity sensor for reference and the digital thermo-hygrometer. Therefore, it was demonstrated that the temperature and humidity sensors of Example prepared by the soldering and mounting method of the present invention operated normally.

Furthermore, the thin film pattern firing method as the microwave heating method of the present invention is described in more detail on the basis of Examples. However, the present invention should not be construed as being limited to them.

Examples 21 to 28

In Examples 21 to 28, the silver conductive paste (trade name REXALPHA, Toyochem Co., Ltd.) was scree-printed on a polyimide sheet. Measurement samples 1 to 8 were prepared on which a conductive thin film pattern was formed with a predetermined size described in Table 4 and a thickness of 0.012 mm. Each size described in Table 4 is a size before being dried by a hot plate. The thin film pattern firing apparatus 100 shown in FIG. 10 was used. The measurement samples 1 to 8 were placed on the hot plate. The thin film patterns were dried by the hot plate at 60° C. for 20 minutes. A solvent was removed. Standing waves in $TM_{110}$ mode were formed in the cylindrical cavity resonator (cavity). Each of the test sheets 1 to 8 was placed in such a manner that the major axis direction of the thin film pattern was oriented in a direction at 90 degrees with respect to the oscillation direction of the magnetic field at the cylinder central axis of the cavity resonator. In this state, each of the test sheets 1 to 8 was transferred by the transfer mechanism 31 from the inlet 12 of the cavity resonator 10 to the outlet 13 through the magnetic field region 52 at the cylinder central axis C. In the cavity resonator 10, each thin film pattern was irradiated with microwaves with a frequency of 2.45 GHz and an output of 100 W. Standing waves in $TM_{110}$ mode were formed. The thin film pattern was heated and fired to add conductivity thereto. A change in the temperature of the thin film pattern at this point in time was measured by a thermal image measurement apparatus (thermo-viewer). InfrREC H8000 (trade name) made by Nippon Avionics Co., Ltd. was used as the thermal image measurement apparatus. The temperature one minute after the irradiation of microwaves was measured and recorded. The volume resistivity of each thin film pattern after the irradiation of microwaves was then measured. The volume resistivity was measured by the four-point probe by Loresta-GX MCP-T610 made by Mitsubishi Chemical Analytech Co., Ltd.

Figure 23:
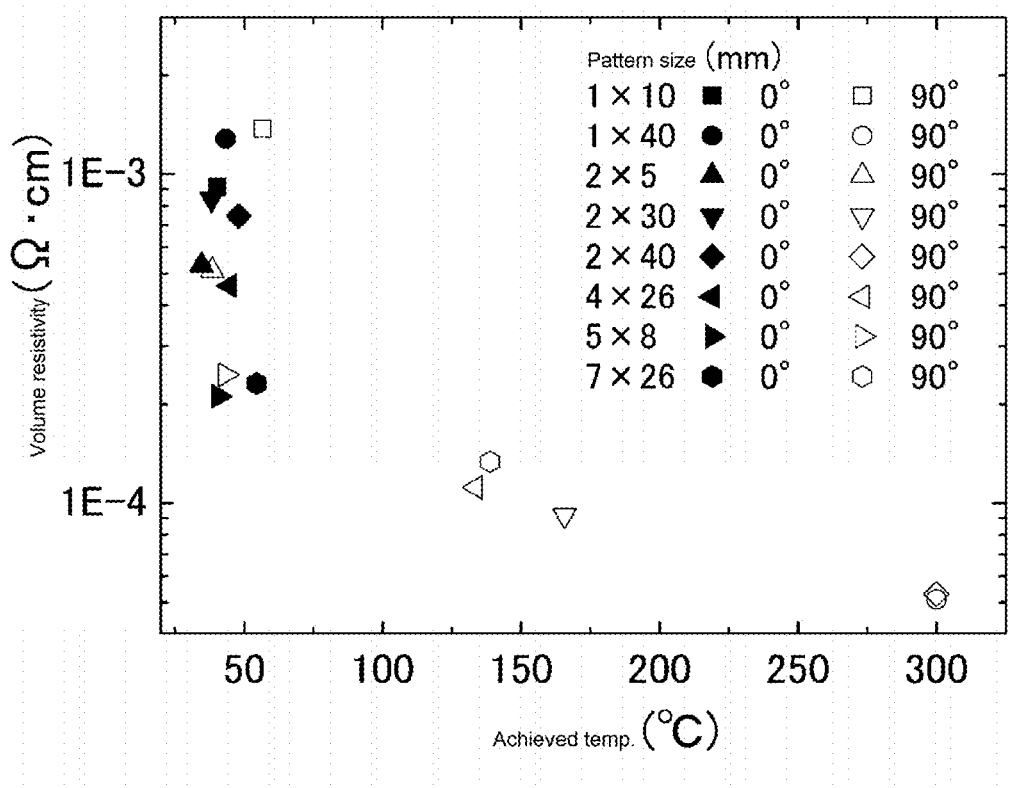
FIG. 23 is a graph showing firing results obtained by changing the pattern size of the thin film pattern, in the direction of the major axis of the thin film pattern with respect to the oscillation direction of the magnetic field in a magnetic field region, in a relationship between the volume resistivity and achieved temperature of each thin film pattern.

The relationship between volume resistivity and heating temperature achieved with the shape of the thin film pattern as a parameter is as shown in FIG. 23.

Comparative Examples 21 to 28

On the other hand, in Comparative Examples 21 to 28, measurement samples were prepared as in Examples 21 to 28, except the point that the major axis direction of each pattern was placed in a direction at 0 degrees with respect to the oscillation direction of the magnetic field, and were fired as in Examples 21 to 28. The relationship between volume resistivity and heating temperature achieved with the shape of the thin film pattern as a parameter is as shown in FIG. 23.

TABLE 4

| Measurement sample | Pattern size Width mm × Length mm |
|---|---|
| 1 | 1 × 10 |
| 2 | 1 × 40 |
| 3 | 2a × 5 |
| 4 | 2 × 30 |
| 5 | 2 × 40 |
| 6 | 4 × 26 |
| 7 | 5 × 8 |
| 8 | 7 × 26 |

FIG. 23 shows the temperature achieved upon the microwave irradiation and the volume resistivity measured after the irradiation of each thin film pattern. The heating temperature of thin film patterns of 1 mm×40 mm and 2 mm×40 mm exceeded the heat resistant temperature of the polyimide sheet within 10 seconds after the microwave irradiation when the major axis of the thin film pattern was placed at a position at 90 degrees with respect to the oscillation direction of the magnetic field. In addition, the heating temperature exceeded 300° C. that is an upper limit of measurement of the thermal image measurement apparatus and was therefore recorded as 300° C. However, the heating temperature actually increased to a higher temperature.

It was found from the results that all the thin film patterns whose major axis was placed in the direction at 0 degrees with respect to the oscillation direction of the magnetic field hardly increased in temperature, and also had a high volume resistivity. Moreover, in terms of the thin film patterns whose major axis was placed at the position at 90 degrees with respect to the oscillation direction of the magnetic field, it was found that the longer and narrower the pattern was (the higher the aspect ratio was), the pattern reached a higher temperature.

It has become clear from the results that there are differences in the availability of firing and achieved temperature, depending on the shape and placement direction of the thin film pattern.

Figure 24:
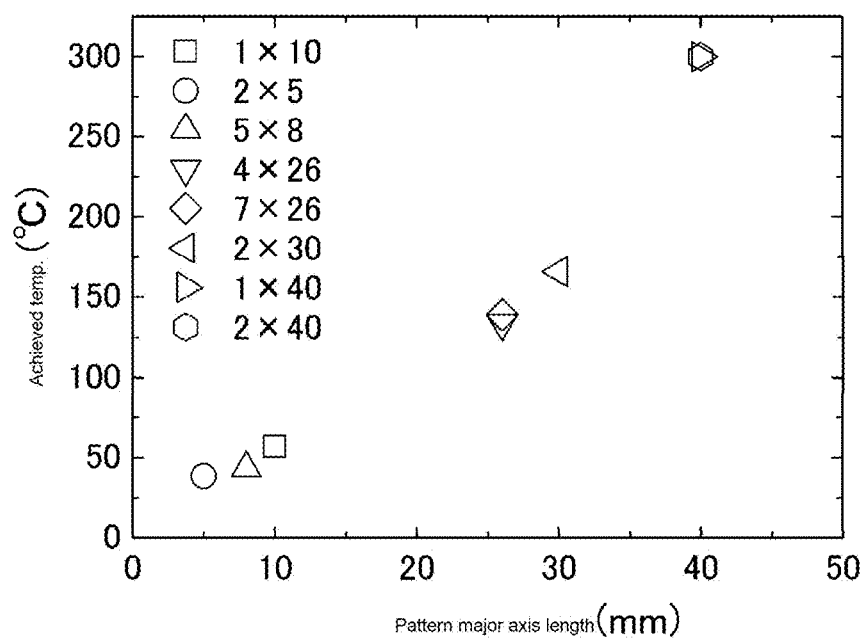
FIG. 24 is a graph showing the relationship between the achieved temperature of the thin film pattern and the length of the thin film pattern in the major axis direction, when the direction of the major axis of the thin film pattern was set at 90 degrees with respect to the oscillation direction of the magnetic field of the magnetic field region.

Moreover, FIG. 24 shows the relationship between the temperature achieved upon microwave irradiation of each thin film pattern whose major axis direction was set at 90 degrees with respect to the oscillation direction of the magnetic field, and the length of the thin film pattern.

It was found from the results that all the thin film patterns having a length of 26 mm or greater in the major axis direction of the thin film pattern increased to or above 130° C. within 10 seconds. Moreover, in terms of the thin film patterns whose major axis was placed at 90 degrees with respect to the oscillation direction of the magnetic field, it was found that the longer and narrower the pattern was (the higher the aspect ratio was), the pattern reached a higher temperature as in FIG. 24.

Hence, it was found that it is important in the firing method of the present invention that the length of the major axis of a thin film pattern is equal to or greater than 26 mm, the aspect ratio is equal to or greater than 3.7, and the major axis of the thin film pattern is disposed at an angle equal to or greater than 45 degrees with respect to the oscillation direction of the magnetic field of the magnetic field region.

Having described our invention as related to the embodiments and Examples, it is our intention that the invention not be limited by any of the details of the description, unless otherwise specified, but rather be construed broadly within its spirit and scope as set out in the accompanying claims.

This application claims priority on Patent Application No. 2018-021455 filed in Japan on Feb. 8, 2018, Patent Application No. 2018-021456 filed in Japan on Feb. 8, 2018, Patent Application No. 2018-021457 filed in Japan on Feb. 8, 2018, and Patent Application No. 2018-182605 filed in Japan on Sep. 27, 2018, each of which is entirely herein incorporated by reference.

DESCRIPTION OF SYMBOLS 1A, 1B, 1C Soldering and mounting apparatus
100 Thin film pattern firing apparatus
2 First group apparatus (upstream first apparatus, upstream apparatus)

3 Second group apparatus (upstream second apparatus, microwave heating apparatus 10)
4 Third group apparatus (microwave heating apparatus 10, downstream apparatus)
5 Fourth group apparatus (downstream apparatus)
6 Base
7 Object to be heated (electrode pattern, thin film pattern)
10 Microwave heating apparatus
11 Cavity resonator
12 Inlet
13 Outlet
14 Microwave supply port (coaxial waveguide converter-type microwave supply port)
15 Window
21 Microwave generator
22 Microwave amplifier
23 Isolator
24 Matcher
25 Antenna
26 Cable
31 Transfer mechanism
31A Supply-side transfer unit
31B Sending-side transfer unit
41 Thermal image measurement apparatus
42, 45, 46 Cable
42 Controller
44 Electromagnetic wave sensor
C Cavity central axis (central axis)

The invention claimed is:

1. A microwave heating apparatus including:
a cavity resonator being a microwave irradiation space of a cylindrical type or a polygonal tube type where two parallel surfaces face each other with a tube central axis as the center, excluding a tube type whose cross-section in a direction perpendicular to the tube central axis is a rectangle; and
a transfer mechanism configured to supply an object to be heated of a magnetic substance, or a magnetic loss material or conductive material, or an object to be heated of a composite material including a magnetic substance, or a magnetic loss material or conductive material, into a space where energy distribution of a magnetic field in the cavity resonator is uniform in such a manner as to pass the object to be heated through a magnetic field region where magnetic field strength of the cavity resonator is maximum and uniform,
wherein the object to be heated supplied by the transfer mechanism is heated in the magnetic field region.

2. A microwave heating method, performed by the microwave heating apparatus of claim 1, using a microwave, including:
controlling a frequency of the microwave, to form a single-mode standing wave;
disposing an object to be heated in a magnetic field region where a strength of a magnetic field formed by the single-mode standing wave is uniform and maximum; and
heating the object to be heated by magnetic heat generation by magnetic loss caused by an action of the magnetic field of the magnetic field region, and/or induction heating by an induced current generated in the object to be heated due to the magnetic field of the magnetic field region.

3. The microwave heating method according to claim 2, wherein the single-mode standing wave is $TM_{n10}$ (where n is an integer of 1 or more) mode or $TE_{10n}$ (where n is an integer of 1 or more) mode.

4. The microwave heating method according to claim 3, wherein the object to be heated is an electrode pattern disposed on a base and an electrical connection electrode of a device.

5. The microwave heating method according to claim 4, wherein the electrode pattern and the electrode connection electrode are heated, to heat and melt solder disposed on the electrode pattern.

6. The microwave heating method according to claim 4, wherein a resonator configured to generate the single-mode standing wave is a cylindrical resonator or a rectangular tubular resonator,
wherein the resonator configured to generate the single-mode standing wave includes an inlet and an outlet in opposing positions on a barrel portion wall thereof,
wherein a transfer mechanism is provided, which is configured to transfer the object to be heated in from the inlet and to transfer the object to be heated out from the outlet, and
wherein at least a part of the electrode pattern in a major axis direction thereof is disposed at an angle equal to or greater than 45 degrees and equal to or less than 90 degrees with respect to an oscillation direction of the magnetic field formed by the single-mode standing wave, whereby the electrode pattern is microwave-heated.

7. The microwave heating method according to claim 6, wherein a resonance frequency is detected, which agrees with the single-mode standing wave that changes depending on a placement state of the object to be heated disposed in the resonator, and
wherein the microwave is adjusted to a frequency agreeing with the resonance frequency, to make the microwave apply into the resonator.

8. The microwave heating method according to claim 7, wherein a reflected wave from a microwave irradiation space in the resonator is measured,
wherein the resonance frequency agreeing with the single-mode standing wave is detected from a frequency of the microwave that minimizes the reflected wave, on the basis of a measurement signal of the reflected wave, and
wherein the frequency of the microwave is controlled.

9. The microwave heating method according to claim 7, wherein energy density of the microwave irradiation space in the resonator is measured,
wherein the resonance frequency agreeing with the single-mode standing wave is detected from a frequency of the microwave that maximizes the energy density, on the basis of a measurement signal of the energy density, and
wherein the frequency of the microwave is controlled.

10. The microwave heating method according to claim 6, wherein a plurality of the resonators is disposed, and
wherein the plurality of the resonators performs microwave heating continuously.

11. The microwave heating method according to claim 4, wherein the electrode pattern includes a thin film with insulation property on an upper part and a lower part thereof.

12. The microwave heating method according to claim 6, wherein it is configured to be capable of moving the base up and down in a direction perpendicular to the oscillation direction of the magnetic field, in the resonator.

13. The microwave heating method according to claim 6, including:
an upstream step including the steps of
printing a primer or an adhesive layer, on the base,
drying the primer or the adhesive layer,
printing the electrode pattern,
drying the electrode pattern,
applying solder paste,
mounting a device, and
determining microwave irradiation conditions; and
a downstream step including the steps of
removing flux,
applying adhesive, and
curing the adhesive,
wherein the base is continuously transferred by the transfer mechanism, and
wherein the upstream step, a microwave heating step by the microwave heating apparatus configured to perform the microwave heating method, and the downstream step are performed in this order.

14. The microwave heating method according to claim 13, wherein in the upstream step, the solder paste application step is performed by a stencil printing apparatus, a dispenser apparatus, or a solder ball mounter.

15. The microwave heating method according to claim 3, wherein in the downstream step, the flux removal step is a cleaning step, the adhesive application step is a stencil printing step, a screen printing step, or a dispensing step, and the adhesive curing step is a heating step by an excimer lamp, an ultraviolet lamp, an infrared lamp, a hot air apparatus, a hot plate, atmospheric-pressure plasma irradiation means, a xenon flash lamp, or a high humidity chamber.

16. The microwave heating method according to claim 5, wherein the microwave heating method includes:
the step of placing the electrode pattern on the base via primer; and
the step of connecting the electrical connection electrode formed on the device onto the electrode pattern via the solder, and bonding the device onto the base between the electrode patterns via an adhesive layer, and
wherein an adhesive is formed around the device.

17. The microwave heating method according to claim 4, wherein at least a part of the electrode pattern in the major axis direction is disposed at an angle equal to or greater than 45 degrees and equal to or less than 90 degrees with respect to an oscillation direction of the magnetic field formed by the single-mode standing wave, whereby the electrode pattern is microwave-heated.

18. The microwave heating method according to claim 4, wherein at least a part of the electrical connection electrode in a major axis thereof is disposed at an angle equal to or greater than 40 degrees and equal to or less than 90 degrees with respect to an oscillation direction of the magnetic field formed by the single-mode standing wave.

19. The microwave heating method according to claim 2, wherein the object to be heated is a thin film pattern disposed on the base,
wherein the thin film pattern is an anisotropic thin film pattern having an aspect ratio of 3.7 or greater,
wherein at least a part of the thin film pattern in a major axis direction thereof is disposed at an angle equal to or greater than 45 degrees and equal to or less than 90 degrees with respect to an oscillation direction of the magnetic field generated in the magnetic field region, and
wherein the base is caused to pass through the magnetic field region.

20. The microwave heating method according to claim 19, wherein a length of the thin film pattern in the major axis direction has a length equal to or greater than 1/10 of a wavelength of the microwave.

21. The microwave heating method according to claim 2, wherein the microwave heating method is a chemical reaction method that heats the object to be heated with microwaves, to cause a chemical reaction.

22. The microwave heating apparatus according to claim 1, wherein the transfer mechanism passes the object to be heated through a space where electric field strength is minimum upon the object to be heated passing through the magnetic field region.

23. The microwave heating apparatus according to claim 22, wherein the cavity resonator is a cavity resonator including a cylindrical microwave irradiation space, in which a standing wave in $TM_{n10}$ (n is an integer of one or more) mode or $TE_{10n}$ (n is an integer of 1 or more) mode where the magnetic field strength is uniform and maximum along a cylinder central axis is formed,
wherein the cavity resonator includes:
an inlet disposed in a barrel portion wall of the cavity resonator, through which a base where the object to be heated that is transferred into the microwave irradiation space is disposed passes; and
an outlet disposed in the barrel portion wall of the cavity resonator, through which the base that is transferred out from the microwave irradiation space passes,
wherein the transfer mechanism is configured to transfer the base in from the inlet and transfer the base out from the outlet through the magnetic field region where the magnetic field strength is maximum, and
wherein at least a part in a major axis direction of a thin film pattern of the object to be heated disposed on the base is set at an angle equal to or greater than 45 degrees and equal to or less than 90 degrees with respect to an oscillation direction of the magnetic field generated in the magnetic field region, and the base is caused to pass through the magnetic field region, whereby the thin film pattern is heated.

24. The microwave heating apparatus according to claim 23, wherein the thin film pattern is an electrode pattern, and wherein the electrode pattern is heated, to melt solder disposed on the electrode pattern.

25. The microwave heating apparatus according to claim 23, wherein the thin film pattern is heated, to be fired.

26. The microwave heating apparatus according to claim 1, wherein the standing wave formed inside the microwave irradiation space is in $TM_{110}$ mode, and
wherein the magnetic field region is a space along the tube central axis of the cavity resonator.

27. The microwave heating apparatus according to claim 26, wherein means for forming the standing wave in $TM_{110}$ mode includes a mechanism configured to control a frequency of a microwave at which a uniform magnetic field distribution state is always maintained along the tube central axis in a state where the object to be heated is inserted in the microwave irradiation space.

28. The microwave heating apparatus according to claim 27, wherein the mechanism configured to control the frequency of the microwave detects a resonance frequency agreeing with the standing wave in $TM_{110}$ mode that changes depending on an insertion state of the object to be heated, to apply a microwave agreeing with the resonance frequency.

29. The microwave heating apparatus according to claim 28, wherein means for detecting the resonance frequency agreeing with the standing wave in $TM_{110}$ mode includes a mechanism configured to measure a reflected wave from the microwave irradiation space, and includes a mechanism configured to control the frequency of the microwave that detects the resonance frequency from a frequency at which the reflected wave is the minimum on the basis of the measurement signal.

30. The microwave heating apparatus according to claim 29, wherein means for detecting the resonance frequency agreeing with the standing wave in $TM_{110}$ mode includes a mechanism configured to measure an energy state in the microwave irradiation space, and includes a mechanism configured to control the frequency of the microwave that detects the resonance frequency from a frequency at which energy density in the microwave irradiation space is the maximum on the basis of the measurement signal.

31. The microwave heating apparatus according to claim 1, wherein an induced current is generated in the object to be heated under an action of a magnetic field that is maximum at the tube central axis of the cavity resonator, whereby the object to be heated is heated.

32. The microwave heating apparatus according to claim 1, wherein the microwave heating apparatus includes one or more cavity resonators.

33. The microwave heating apparatus according to claim 1, wherein the object to be heated is a thin film pattern disposed on the base,
   wherein the microwave heating apparatus is provided with: an upstream apparatus configured to preliminarily dry the base, before heating and firing the base with the microwave heating apparatus; and a downstream apparatus configured to perform post-processing, after firing the thin film pattern with the microwave heating apparatus,
   wherein the transfer mechanism transfers the base continuously, and
   wherein the upstream apparatus, the microwave heating apparatus, and the downstream apparatus perform processing in this order.

34. The microwave heating apparatus according to claim 33, wherein the upstream apparatus includes an infrared heating apparatus, a hot air heating apparatus, or a hot plate, which preliminarily dries the thin film pattern.

35. The microwave heating apparatus according to claim 33, wherein the downstream apparatus includes heating means for further sintering the thin film pattern, and
   wherein the heating means includes an excimer lamp, an ultraviolet lamp, atmospheric-pressure plasma irradiation means, or a xenon flash lamp.

36. The microwave heating apparatus according to claim 1, wherein the transfer mechanism is capable of moving the object to be heated up and down in a direction perpendicular to the oscillation direction of the magnetic field in the cavity resonator.

37. The microwave heating apparatus according to claim 1, wherein the microwave heating apparatus is a chemical reaction apparatus configured to heat the object to be heated with a magnetic field generated by a microwave, to cause a chemical reaction.

38. A chemical reaction method, including: using the microwave heating method according to claim 2,
   wherein the object to be heated is heated, to cause a chemical reaction.

\* \* \* \* \*